US012775920B2

(12) United States Patent
Dhupkar et al.

(10) Patent No.: US 12,775,920 B2
(45) Date of Patent: Oct. 27, 2026

(54) COLLATERAL MANAGEMENT WITH BLOCKCHAIN AND SMART CONTRACTS APPARATUSES, METHODS AND SYSTEMS

(71) Applicant: FMR LLC, Boston, MA (US)

(72) Inventors: Sanjeev Dhupkar, Cary, NC (US); Nishant Mehta, Jersey City, NJ (US); Harsh Singh, Edison, NJ (US); Thomas Stephen McGuire, Galway (IE)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/125,608

(22) Filed: Sep. 7, 2018

(65) Prior Publication Data

US 2019/0005469 A1 Jan. 3, 2019

Related U.S. Application Data

(63) Continuation-in-part of application No. 15/898,220, filed on Feb. 15, 2018, now Pat. No. 12,452,075,
(Continued)

(51) Int. Cl.
*G06Q 20/06* (2012.01)
*G06F 16/23* (2019.01)
(Continued)

(52) U.S. Cl.
CPC ......... *G06Q 20/06* (2013.01); *G06F 16/2379* (2019.01); *G06F 16/27* (2019.01);
(Continued)

(58) Field of Classification Search
CPC .... G06Q 20/06; G06Q 20/065; G06Q 20/389; G06Q 20/10; G06Q 20/3829;
(Continued)

(56) References Cited

U.S. PATENT DOCUMENTS 5,839,119 A 11/1998 Krsul
6,202,068 B1 3/2001 Kraay et al.
(Continued)

FOREIGN PATENT DOCUMENTS

CA 2870844 A1 5/2015
CA 2843034 A1 8/2015
(Continued)

OTHER PUBLICATIONS

Screenshot of entry in USPTO TESS for "Ethereum" (Year: 2020).*
(Continued)

*Primary Examiner* — Yingying Zhou
(74) *Attorney, Agent, or Firm* — Hanchuk Kheit LLP.; Walter G. Hanchuk

(57) ABSTRACT

The Collateral Management with Blockchain and Smart Contracts Apparatuses, Methods and Systems ("CMBSC") transforms borrow transaction request inputs via CMBSC components into borrow transaction init notification, borrow transaction sync notification outputs. A borrow transaction request associated with a borrow transaction is obtained. Transaction attributes associated with the borrow transaction are stored in a database. The transaction process optimizer component is notified regarding the borrow transaction. A blockchain sync notification associated with the borrow transaction is obtained from the transaction process optimizer component. The stored transaction attributes associated with the borrow transaction are filtered. A smart contract associated with the borrow transaction is generated. The generated smart contract is sent to a blockchain node of a blockchain network. A smart contract notification associated with the smart contract is received. A push notification regarding the smart contract notification is provided to a user interface component of a user's client.

17 Claims, 22 Drawing Sheets

Related U.S. Application Data which is a continuation-in-part of application No. 15/844,375, filed on Dec. 15, 2017, now Pat. No. 11,636,471, and a continuation-in-part of application No. 15/844,404, filed on Dec. 15, 2017, now Pat. No. 11,436,598, and a continuation-in-part of application No. 15/844,387, filed on Dec. 15, 2017, and a continuation-in-part of application No. 15/486,243, filed on Apr. 12, 2017, now Pat. No. 11,488,147, and a continuation-in-part of application No. 15/210,807, filed on Jul. 14, 2016, and a continuation-in-part of application No. 15/210,817, filed on Jul. 14, 2016, and a continuation-in-part of application No. 15/210,795, filed on Jul. 14, 2016, now abandoned, and a continuation-in-part of application No. 15/210,813, filed on Jul. 14, 2016, now abandoned, and a continuation-in-part of application No. 15/210,821, filed on Jul. 14, 2016, now abandoned, and a continuation-in-part of application No. 15/210,781, filed on Jul. 14, 2016, now abandoned, and a continuation-in-part of application No. 15/209,701, filed on Jul. 13, 2016, now abandoned, and a continuation-in-part of application No. 15/209,714, filed on Jul. 13, 2016, now Pat. No. 10,339,523, and a continuation-in-part of application No. 15/209,709, filed on Jul. 13, 2016, and a continuation-in-part of application No. 15/019,926, filed on Feb. 9, 2016, now abandoned, and a continuation-in-part of application No. 14/963,165, filed on Dec. 8, 2015, now Pat. No. 10,504,179, and a continuation-in-part of application No. 14/799,229, filed on Jul. 14, 2015, now abandoned, and a continuation-in-part of application No. 14/799,282, filed on Jul. 14, 2015, now abandoned, and a continuation-in-part of application No. 14/799,242, filed on Jul. 14, 2015, now abandoned.

(60) Provisional application No. 62/273,450, filed on Dec. 31, 2015, provisional application No. 62/273,452, filed on Dec. 31, 2015, provisional application No. 62/273,449, filed on Dec. 31, 2015, provisional application No. 62/273,447, filed on Dec. 31, 2015, provisional application No. 62/273,453, filed on Dec. 31, 2015.

(51) Int. Cl.

| | |
|---|---|
| ***G06F 16/27*** | (2019.01) |
| ***G06N 3/10*** | (2006.01) |
| ***G06N 5/046*** | (2023.01) |
| ***G06N 20/10*** | (2019.01) |
| ***G06Q 20/10*** | (2012.01) |
| ***G06Q 20/24*** | (2012.01) |
| ***G06Q 20/36*** | (2012.01) |
| ***G06Q 20/38*** | (2012.01) |
| ***G06Q 40/04*** | (2012.01) |
| ***H04L 9/00*** | (2022.01) |
| ***H04L 9/06*** | (2006.01) |
| ***H04L 9/32*** | (2006.01) |

(52) U.S. Cl.

CPC ........... *G06N 5/046* (2013.01); *G06Q 20/065* (2013.01); *G06Q 20/10* (2013.01); *G06Q 20/24* (2013.01); *G06Q 20/36* (2013.01); *G06Q 20/3829* (2013.01); *G06Q 20/389* (2013.01); *G06Q 40/04* (2013.01); *H04L 9/0637* (2013.01); *H04L 9/3236* (2013.01); *H04L 9/3297* (2013.01); *G06N 3/105* (2013.01); *G06N 20/10* (2019.01); *G06Q 2220/00* (2013.01); *H04L 9/50* (2022.05); *H04L 2209/56* (2013.01)

(58) Field of Classification Search

CPC ........ G06Q 20/36; G06Q 20/24; G06Q 40/04; G06Q 2220/00; G06N 5/046; G06N 3/08; G06N 20/10; G06N 3/105; H04L 9/3297; H04L 9/3236; H04L 9/0637; H04L 2209/56; H04L 2209/38; G06F 16/2379; G06F 16/27; G06F 9/466

See application file for complete search history.

(56) References Cited

U.S. PATENT DOCUMENTS

| | | | | |
|---|---|---|---|---|
| 7,111,023 | B2 * | 9/2006 | Norcott | G06F 16/2358 707/999.203 |
| 8,838,982 | B2 * | 9/2014 | Carlson | H04L 67/10 726/28 |
| 8,848,053 | B2 | 9/2014 | Scanlon | |
| 9,076,290 | B2 | 7/2015 | Griffin | |
| 9,082,113 | B2 | 7/2015 | Shea et al. | |
| 9,087,326 | B2 | 7/2015 | Shea et al. | |
| 9,098,190 | B2 | 8/2015 | Zhou | |
| 9,098,387 | B1 | 8/2015 | Curtis et al. | |
| 9,098,874 | B2 | 8/2015 | Chandra et al. | |
| 9,117,341 | B2 | 8/2015 | Marantelli | |
| 9,122,749 | B2 | 9/2015 | Elmore et al. | |
| 9,129,338 | B2 | 9/2015 | Liu | |
| 9,129,339 | B2 | 9/2015 | Liu | |
| 9,135,616 | B2 | 9/2015 | Hirson et al. | |
| 9,135,787 | B1 | 9/2015 | Russell | |
| 9,144,742 | B1 | 9/2015 | Curtis et al. | |
| 9,153,088 | B2 | 10/2015 | Spencer, II | |
| 9,160,717 | B2 | 10/2015 | Bhanoo et al. | |
| 9,451,030 | B2 | 9/2016 | Schunder | |
| 9,910,895 | B2 * | 3/2018 | Wagner | G06F 16/435 |
| 9,967,333 | B2 | 5/2018 | Chen | |
| 10,095,549 | B1 * | 10/2018 | Needham | G06F 21/602 |
| 10,171,245 | B2 * | 1/2019 | Wilkins | G06Q 40/04 |
| 10,269,009 | B1 | 4/2019 | Winklevoss | |
| 10,484,168 | B2 | 11/2019 | Ford | |
| 10,586,062 | B1 | 3/2020 | Rangan | |
| 10,833,843 | B1 | 11/2020 | Vijayvergia | |
| 10,990,693 | B1 | 4/2021 | Newman | |
| 2002/0032642 | A1 * | 3/2002 | Chichilnisky | G06Q 40/04 705/37 |
| 2002/0059263 | A1 | 5/2002 | Shima | |
| 2002/0099559 | A1 * | 7/2002 | Liu | G06Q 30/0641 707/E17.037 |
| 2003/0191709 | A1 | 10/2003 | Elston | |
| 2003/0233554 | A1 | 12/2003 | Litai | |
| 2005/0165627 | A1 | 7/2005 | Fotsch | |
| 2006/0136301 | A1 | 6/2006 | Grovit | |
| 2006/0236384 | A1 | 10/2006 | Lindholm | |
| 2007/0094298 | A1 * | 4/2007 | Parent | G06F 16/284 707/999.102 |
| 2007/0215695 | A1 | 9/2007 | Trane | |
| 2008/0064333 | A1 | 3/2008 | Hymes | |
| 2009/0106125 | A1 | 4/2009 | Rock | |
| 2010/0185504 | A1 | 7/2010 | Rajan | |
| 2012/0158586 | A1 | 6/2012 | Ganti | |
| 2013/0046794 | A1 | 2/2013 | De Magalhaes | |
| 2013/0132219 | A1 | 5/2013 | Liberty | |
| 2014/0058862 | A1 | 2/2014 | Celkonas | |
| 2014/0074497 | A1 | 3/2014 | Griffin | |
| 2014/0188691 | A1 | 7/2014 | Blank | |
| 2014/0195415 | A1 | 7/2014 | Broberg | |
| 2015/0018084 | A1 | 1/2015 | Gatto | |
| 2015/0120569 | A1 | 4/2015 | Belshe | |
| 2015/0170112 | A1 | 6/2015 | DeCastro | |
| 2015/0195099 | A1 | 7/2015 | Imes | |
| 2015/0205929 | A1 | 7/2015 | Brama | |
| 2015/0206106 | A1 | 7/2015 | Yago | |
| 2015/0206240 | A1 | 7/2015 | Baker | |

(56) References Cited

U.S. PATENT DOCUMENTS

| | | | | |
|---|---|---|---|---|
| 2015/0213008 | A1 | 7/2015 | Orsini et al. | |
| 2015/0213351 | A1 | 7/2015 | Wyatt | |
| 2015/0213419 | A1 | 7/2015 | Lyons et al. | |
| 2015/0213437 | A1 | 7/2015 | Wyatt | |
| 2015/0220892 | A1 | 8/2015 | Allen | |
| 2015/0220928 | A1 | 8/2015 | Allen | |
| 2015/0227897 | A1 | 8/2015 | Loera | |
| 2015/0227898 | A1 | 8/2015 | Ballout | |
| 2015/0227913 | A1 | 8/2015 | Ballout | |
| 2015/0245084 | A1 | 8/2015 | Downing et al. | |
| 2015/0248672 | A1 | 9/2015 | Bayer | |
| 2015/0254640 | A1 | 9/2015 | Cassano et al. | |
| 2015/0254768 | A1 | 9/2015 | Menon et al. | |
| 2015/0261269 | A1 | 9/2015 | Bruscoe | |
| 2015/0262137 | A1 | 9/2015 | Armstrong | |
| 2015/0262138 | A1 | 9/2015 | Hudon | |
| 2015/0262139 | A1 | 9/2015 | Shtylman | |
| 2015/0262140 | A1 | 9/2015 | Armstrong | |
| 2015/0262141 | A1 | 9/2015 | Rebernik et al. | |
| 2015/0262168 | A1 | 9/2015 | Armstrong | |
| 2015/0262171 | A1 | 9/2015 | Lengschaedel et al. | |
| 2015/0262172 | A1 | 9/2015 | Rebernik | |
| 2015/0262173 | A1 | 9/2015 | Langschaedel et al. | |
| 2015/0262176 | A1 | 9/2015 | Langschaedel et al. | |
| 2015/0262251 | A1 | 9/2015 | Knobel | |
| 2015/0269538 | A1 | 9/2015 | Stanchfield | |
| 2015/0269539 | A1 | 9/2015 | MacGregor et al. | |
| 2015/0269541 | A1 | 9/2015 | MacGregor et al. | |
| 2015/0269570 | A1 | 9/2015 | Phan | |
| 2015/0271183 | A1 | 9/2015 | MacGregor et al. | |
| 2015/0278820 | A1 | 10/2015 | Meadows | |
| 2015/0286995 | A1 | 10/2015 | Korosec | |
| 2015/0287026 | A1 | 10/2015 | Yang et al. | |
| 2015/0294308 | A1 | 10/2015 | Pauker et al. | |
| 2015/0294424 | A1 | 10/2015 | Hakim | |
| 2015/0294425 | A1 | 10/2015 | Benson | |
| 2015/0302357 | A1 | 10/2015 | Chandra | |
| 2015/0302400 | A1 | 10/2015 | Metral | |
| 2015/0302401 | A1 | 10/2015 | Metral | |
| 2015/0302441 | A1 | 10/2015 | Katsuyama et al. | |
| 2015/0302446 | A1 | 10/2015 | Park et al. | |
| 2015/0324789 | A1 | 11/2015 | Dvorak | |
| 2015/0332283 | A1 | 11/2015 | Witchey | |
| 2016/0019522 | A1 | 1/2016 | Granbery | |
| 2016/0073279 | A1 | 3/2016 | Johnsson | |
| 2016/0086175 | A1 | 3/2016 | Finlow-Bates | |
| 2016/0210632 | A1 | 7/2016 | Li | |
| 2016/0335397 | A1 | 11/2016 | Blum | |
| 2017/0005804 | A1 | 1/2017 | Zinder | |
| 2017/0011460 | A1 | 1/2017 | Molinari | |
| 2017/0180134 | A1 | 6/2017 | King | |
| 2017/0232300 | A1* | 8/2017 | Tran | G06F 1/163 434/247 |
| 2017/0236104 | A1 | 8/2017 | Biton | |
| 2017/0300627 | A1 | 10/2017 | Giordano | |
| 2018/0018647 | A1 | 1/2018 | Fredman | |
| 2018/0062835 | A1 | 3/2018 | Hamel | |
| 2018/0157825 | A1 | 6/2018 | Eksten | |
| 2018/0218176 | A1* | 8/2018 | Voorhees | G06Q 20/02 |
| 2018/0285996 | A1* | 10/2018 | Ma | H04L 9/0637 |
| 2018/0288022 | A1 | 10/2018 | Madisetti | |
| 2019/0028277 | A1 | 1/2019 | Jayachandran | |
| 2019/0081789 | A1* | 3/2019 | Madisetti | H04L 9/0637 |
| 2019/0163883 | A1 | 5/2019 | Savanah | |
| 2019/0361917 | A1* | 11/2019 | Tran | H04W 12/108 |
| 2020/0119925 | A1 | 4/2020 | Wang | |
| 2020/0167773 | A1 | 5/2020 | Cevenka | |

FOREIGN PATENT DOCUMENTS

| | | | |
|---|---|---|---|
| CA | 2845648 | A1 | 9/2015 |
| EP | 2820797 | A1 | 1/2015 |
| EP | 2831823 | A1 | 2/2015 |
| EP | 2874112 | A1 | 5/2015 |
| EP | 2896001 | A1 | 7/2015 |
| WO | 2008065345 | A1 | 6/2008 |
| WO | 2012142521 | A2 | 10/2012 |
| WO | 2013078990 | A1 | 6/2013 |
| WO | 2014201059 | A1 | 12/2014 |
| WO | 2015004820 | A1 | 1/2015 |
| WO | 2015016356 | A1 | 2/2015 |
| WO | 2015024129 | A1 | 2/2015 |
| WO | 2015051692 | A1 | 4/2015 |
| WO | 2015058282 | A1 | 4/2015 |
| WO | 2015059669 | A1 | 4/2015 |
| WO | 2015077378 | A1 | 5/2015 |
| WO | 2015085393 | A1 | 6/2015 |
| WO | 2015095761 | A1 | 6/2015 |
| WO | 2015106285 | A1 | 7/2015 |
| WO | 2015113519 | A1 | 8/2015 |
| WO | 2015116998 | A2 | 8/2015 |
| WO | 2015120606 | A1 | 8/2015 |
| WO | 2015134890 | A1 | 9/2015 |
| WO | 2015135018 | A1 | 9/2015 |
| WO | 2015142765 | A1 | 9/2015 |
| WO | 2015143068 | A1 | 9/2015 |
| WO | 2015144971 | A1 | 10/2015 |
| WO | 2015148725 | A2 | 10/2015 |
| WO | 2016025990 | | 2/2016 |

OTHER PUBLICATIONS

White, "How Computers Work," 2003, Que Publishing, 7th Ed., p. 4 (Year: 2003).*

Third party submission filed in related U.S. Appl. No. 14/799,242.

"On the Privacy Provisions of Bloom Filters in Lightweight Bitcoin Clients", Arthur Gervais et al, International Association For Cryptologic Research, vol. 20141013:202348, Oct. 2014, pp. 1-11.

"Developer Guide -Bitcoin", Anonymous, May 11, 2015, pp. 1-48.

European Search Report, dated Feb. 13, 2019 for EP Application No. 16825146.0.

Supplementary Search Report dated May 27, 2019 for EP Application No. 16825146.

"Distributed Consensus Technologies in Crytocurrency Applications", Francisco Rivera, Jul. 15, 2014.

"Blockchain Electronic Vote Contents", Pierre Noizat et al., Apr. 29, 2015.

"Smart Oracles: A Simple, Powerful Approach to Smart Contracts? Codius/codius WiKi? GitHub", Jul. 17, 2014, https://github.com/codius/codius/wiki/Smart-Oracles:- A-Simple,-Powerful-Approach-to-Smart-Contracts.

"Crytocurrencies, smart contracts, and artificial intelligence", Steve Omohundro, Dec 19, 2014, AI Matters, ACM vol. 1, No. 2.

* cited by examiner

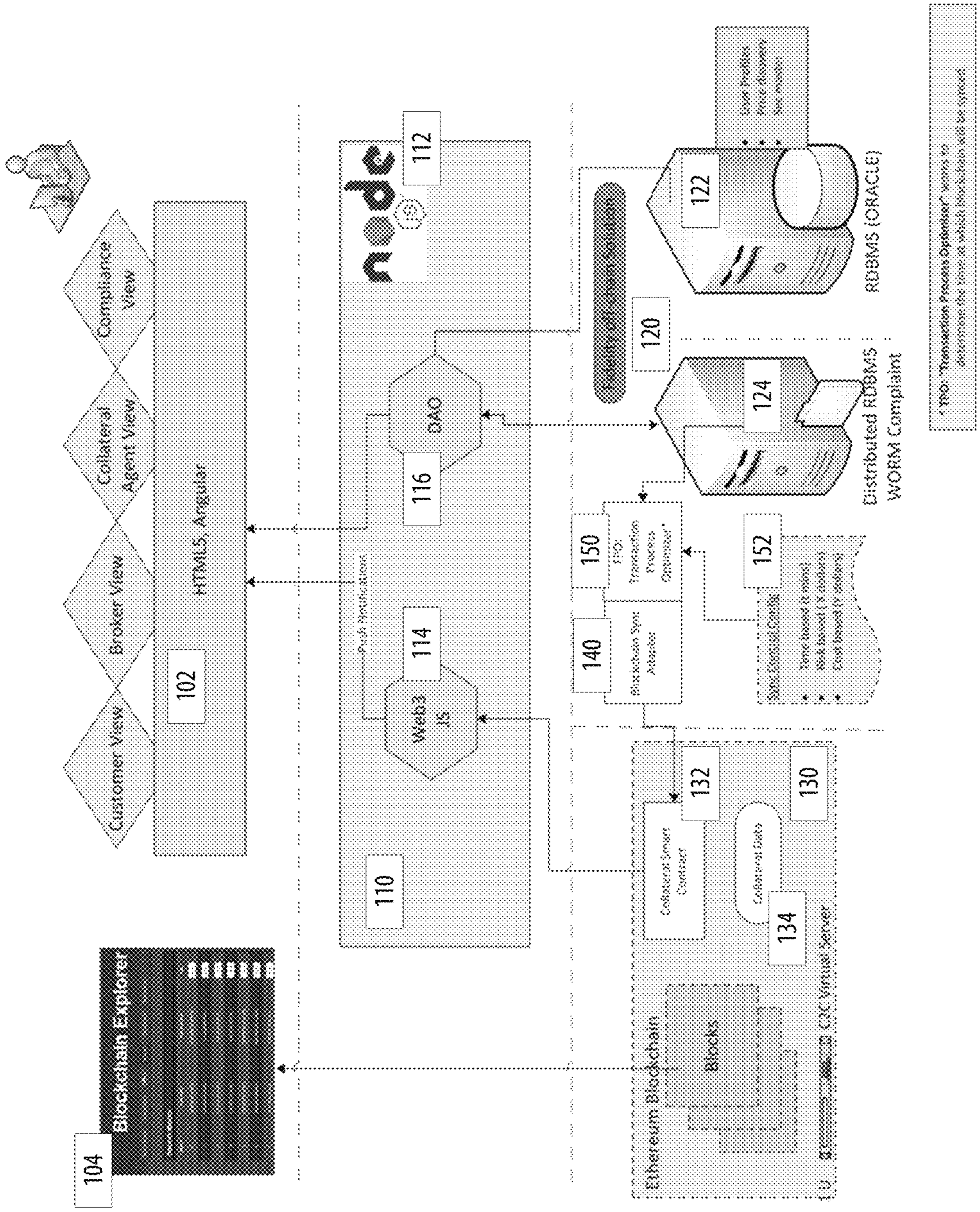
FIGURE 1: CMBSC ARCHITECTURE

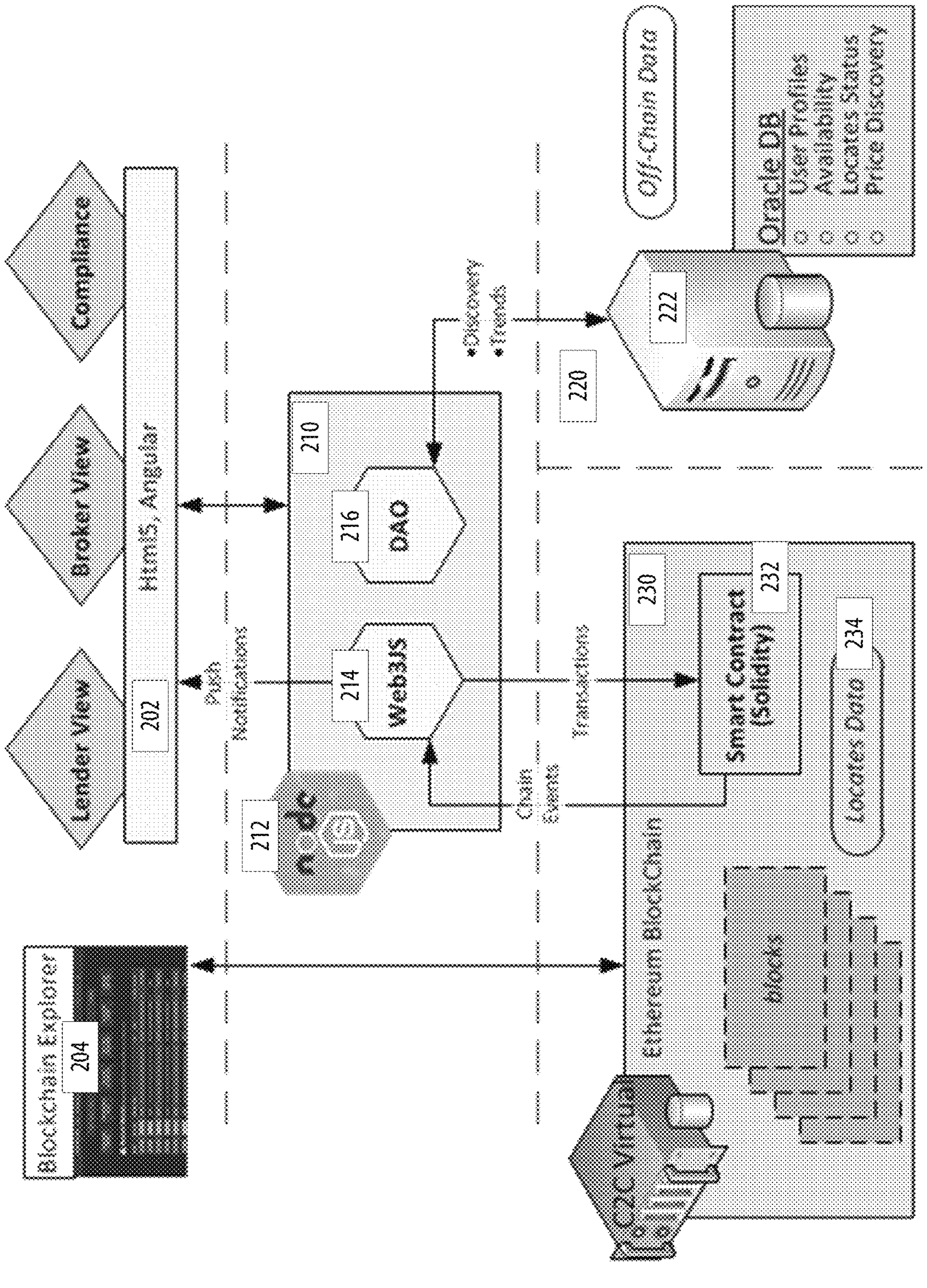
FIGURE 2: CMBSC ARCHITECTURE

FIGURE 3: CMBSC IMPLEMENTATION CASE
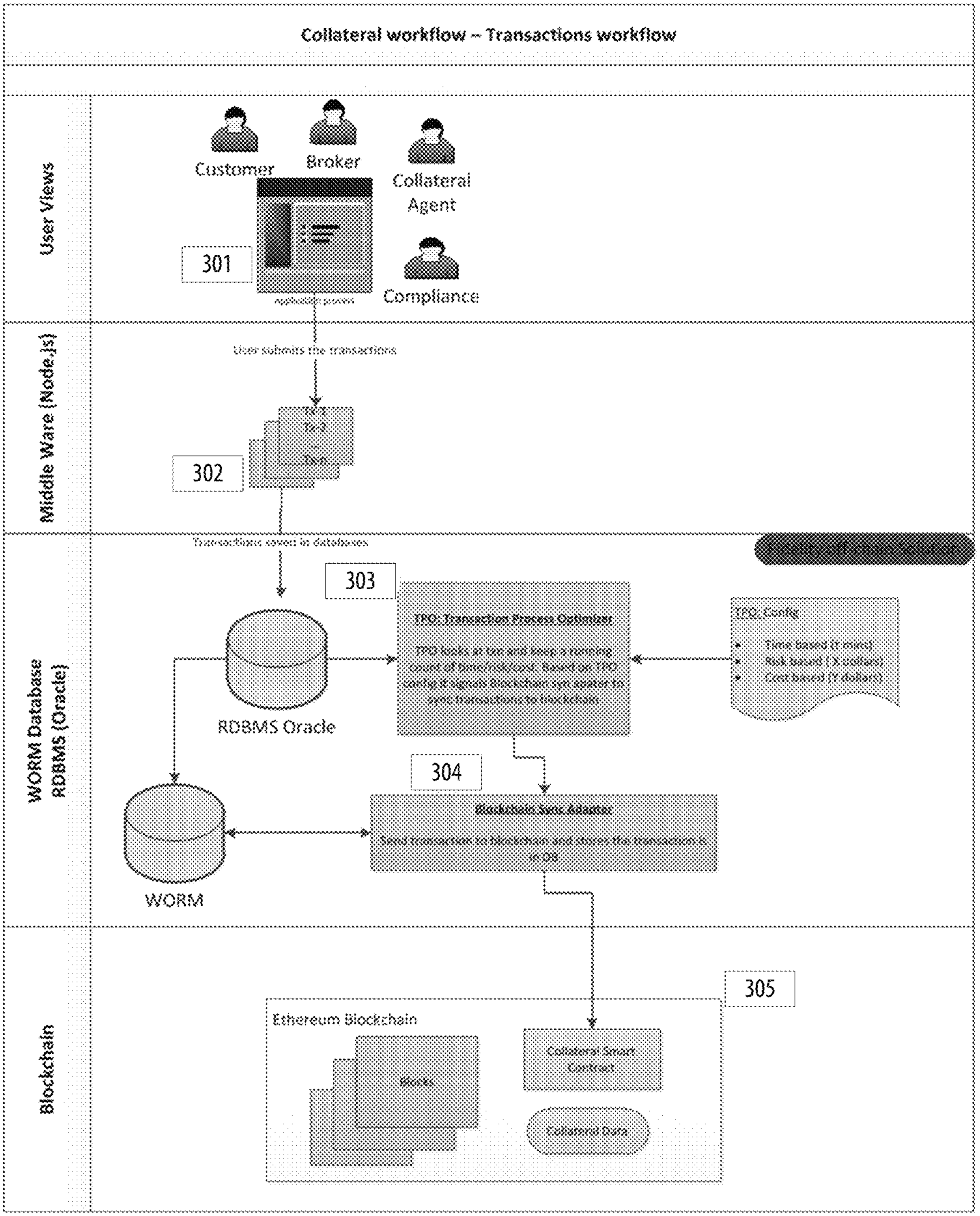

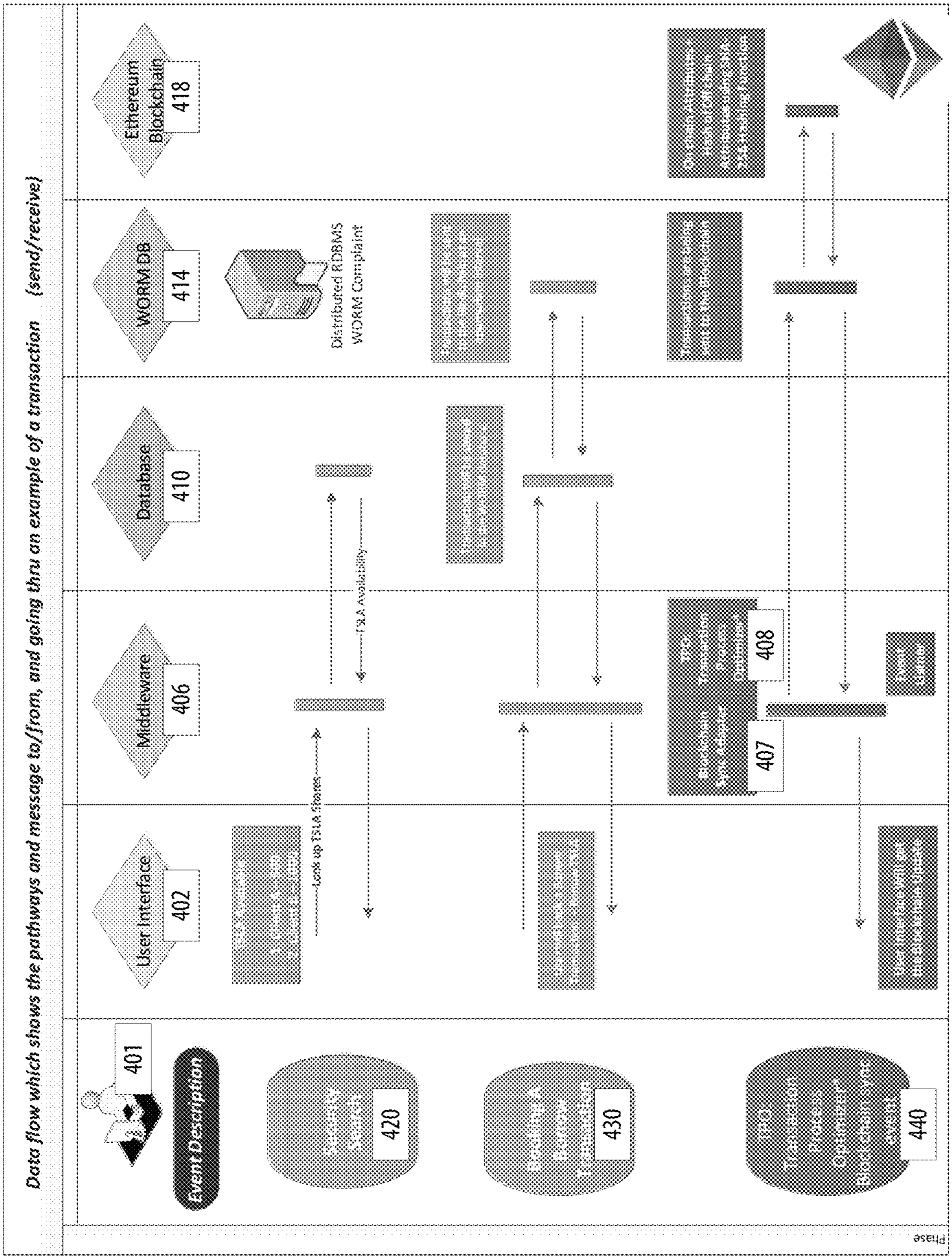
FIGURE 4: CMBSC DATA FLOW

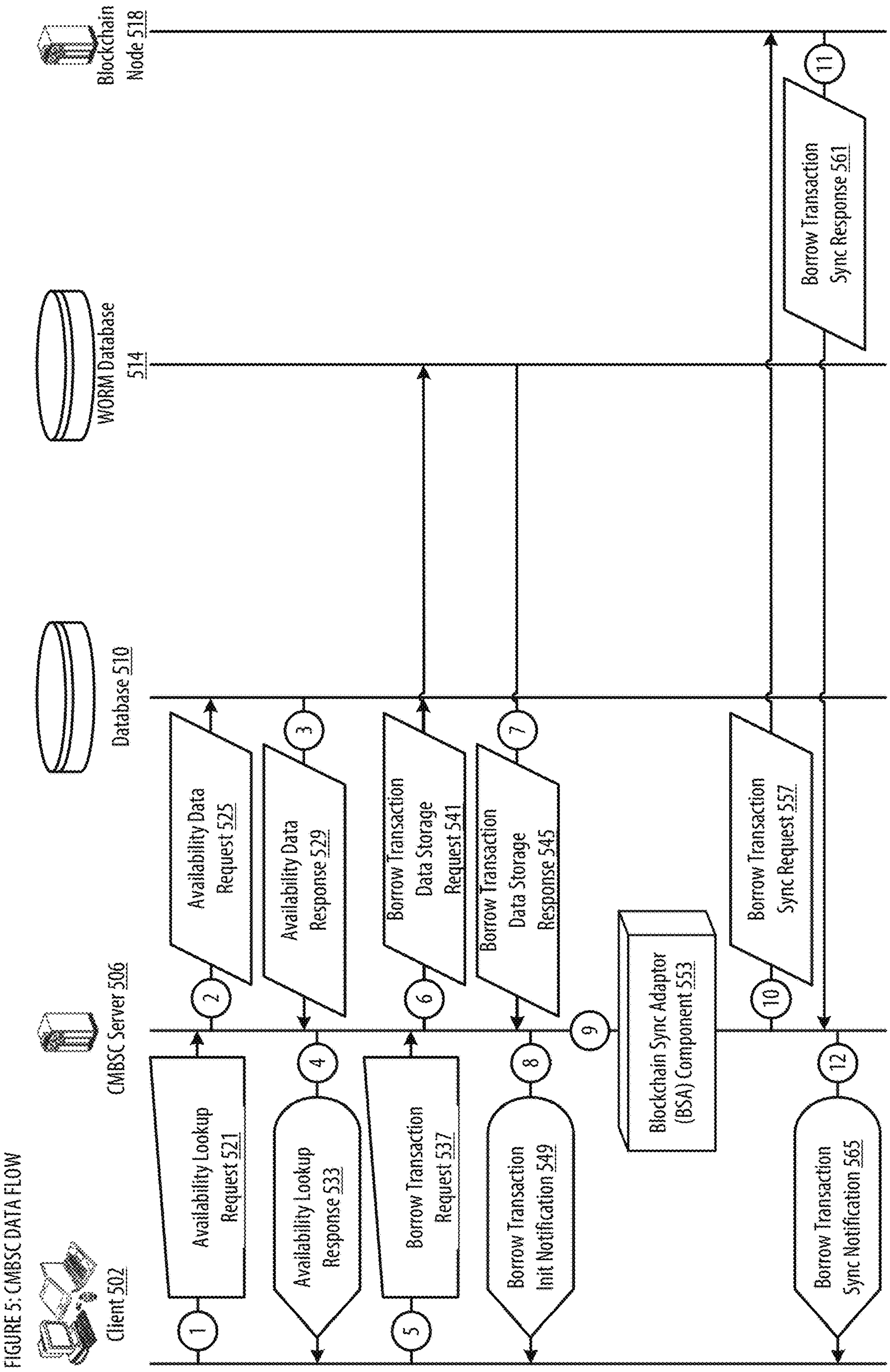
FIGURE 5: CMBSC DATA FLOW
Client 502
CMBSC Server 506
Database 510
WORM Database 514
Blockchain Node 518
Availability Lookup Request 521
Availability Data Request 525
Availability Data Response 529
Availability Lookup Response 533
Borrow Transaction Request 537
Borrow Transaction Data Storage Request 541
Borrow Transaction Data Storage Response 545
Borrow Transaction Init Notification 549
Blockchain Sync Adaptor (BSA) Component 553
Borrow Transaction Sync Request 557
Borrow Transaction Sync Response 561
Borrow Transaction Sync Notification 565
1
2
3
4
5
6
7
8
9
10
11
12

FIGURE 6A: CMBSC BSA COMPONENT
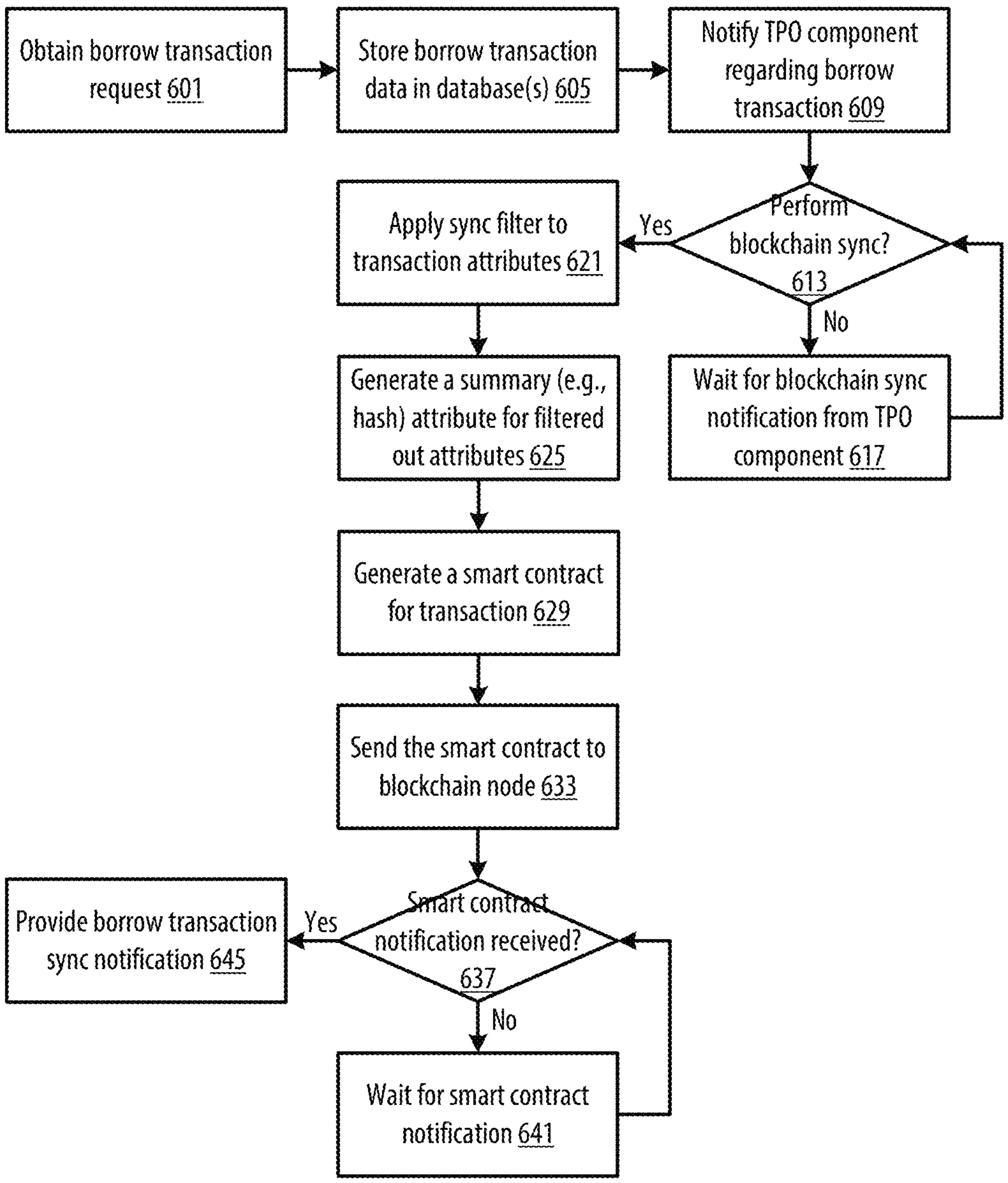

FIGURE 6B: CMBSC TPO COMPONENT
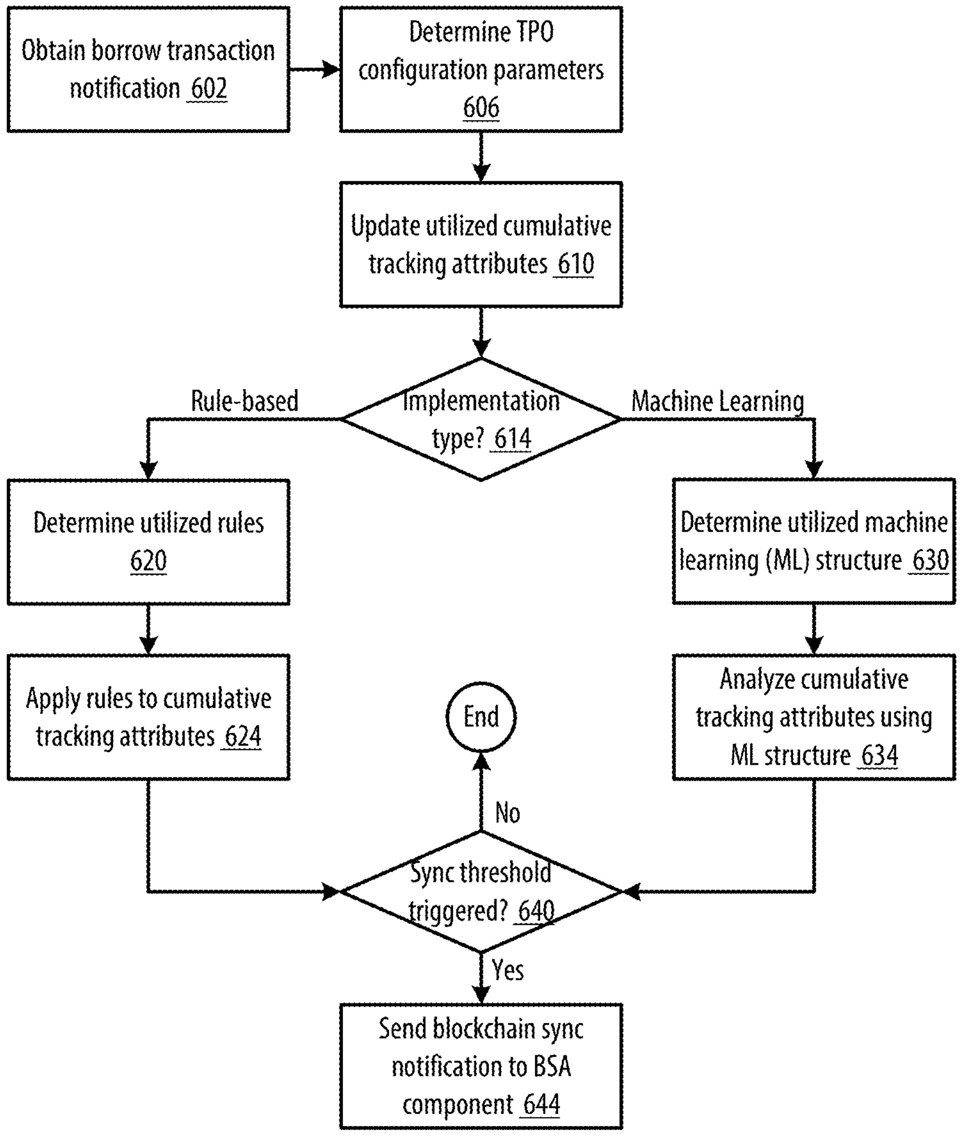

FIGURE 7: CMBSC SCREENSHOT

| *Fields* | *Example* | Off Chain (Stored in RDBMS & WORM Database) | *On Chain (Stored on Blockchain)* |
|---|---|---|---|
| ***Customer Information*** | | | |
| Customer Account Number | 123456789 | Off Chain Attribute | On Chain Attribute |
| Customer Social Security Number | 145278369 | Off Chain Attribute | |
| Customer Address | 45 Brayant Park, NYC, 10016 | Off Chain Attribute | |
| Customer Birthdate | 10/18/1990 | Off Chain Attribute | |
| ***Broker Dealer Information*** | | | |
| Broker Dealer Account Number | 456123789 | Off Chain Attribute | On Chain Attribute |
| Broker Dealer Name | Fidelity | Off Chain Attribute | |
| Broker Dealer Address | 200 World Trade Center, Boston | Off Chain Attribute | |
| ***Collateral Agent Information*** | | | |
| Collateral Agent Code | BAC100 | Off Chain Attribute | On Chain Attribute |
| Collateral Agent Name | Bank Of America | Off Chain Attribute | |
| Collateral Agent Address | 100 North Tryon Street, Charlotte, NC | Off Chain Attribute | |
| ***Company*** | | | |
| Company Name | PetMed Express, Inc. | Off Chain Attribute | |
| Cusip | 716382106 | Off Chain Attribute | On Chain Attribute |
| Ticker | PETS | Off Chain Attribute | |
| ***Customer Account Details*** | | | |
| # Shares Available to Lend | 800 | Off Chain Attribute | On Chain Attribute |
| # Shares to be Borrowed | 250 | Off Chain Attribute | On Chain Attribute |
| On Loan | 2200 | Off Chain Attribute | On Chain Attribute |
| Customer's Current Collateral with Agent | $ 390,247 | Off Chain Attribute | On Chain Attribute |
| Anticipated Delta | $ - | Off Chain Attribute | On Chain Attribute |
| Anticipated Collateral | $ 24,885,245 | Off Chain Attribute | On Chain Attribute |
| ***Broker Dealer Account Details*** | | | |
| # Shares to be Borrowed | 250 | Off Chain Attribute | On Chain Attribute |
| On Loan | 2200 | Off Chain Attribute | On Chain Attribute |
| Broker Dealer's Current Collateral with Agent | $ 24,885,245 | Off Chain Attribute | On Chain Attribute |
| | | | *Hash (SHA-256) of off chain attributes* |

FIGURE 8: CMBSC SCREENSHOT
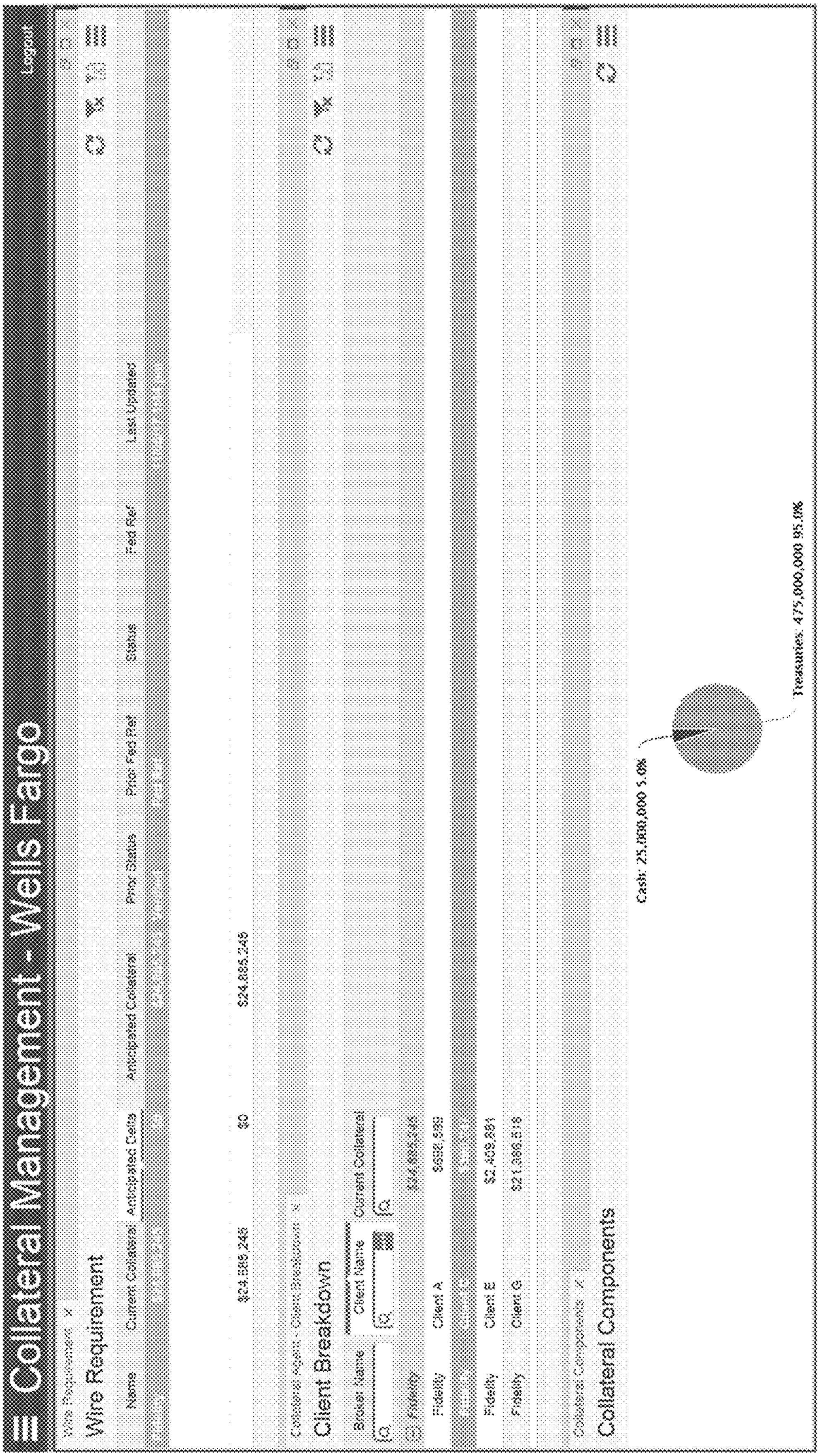

FIGURE 9: CMBSC SCREENSHOT
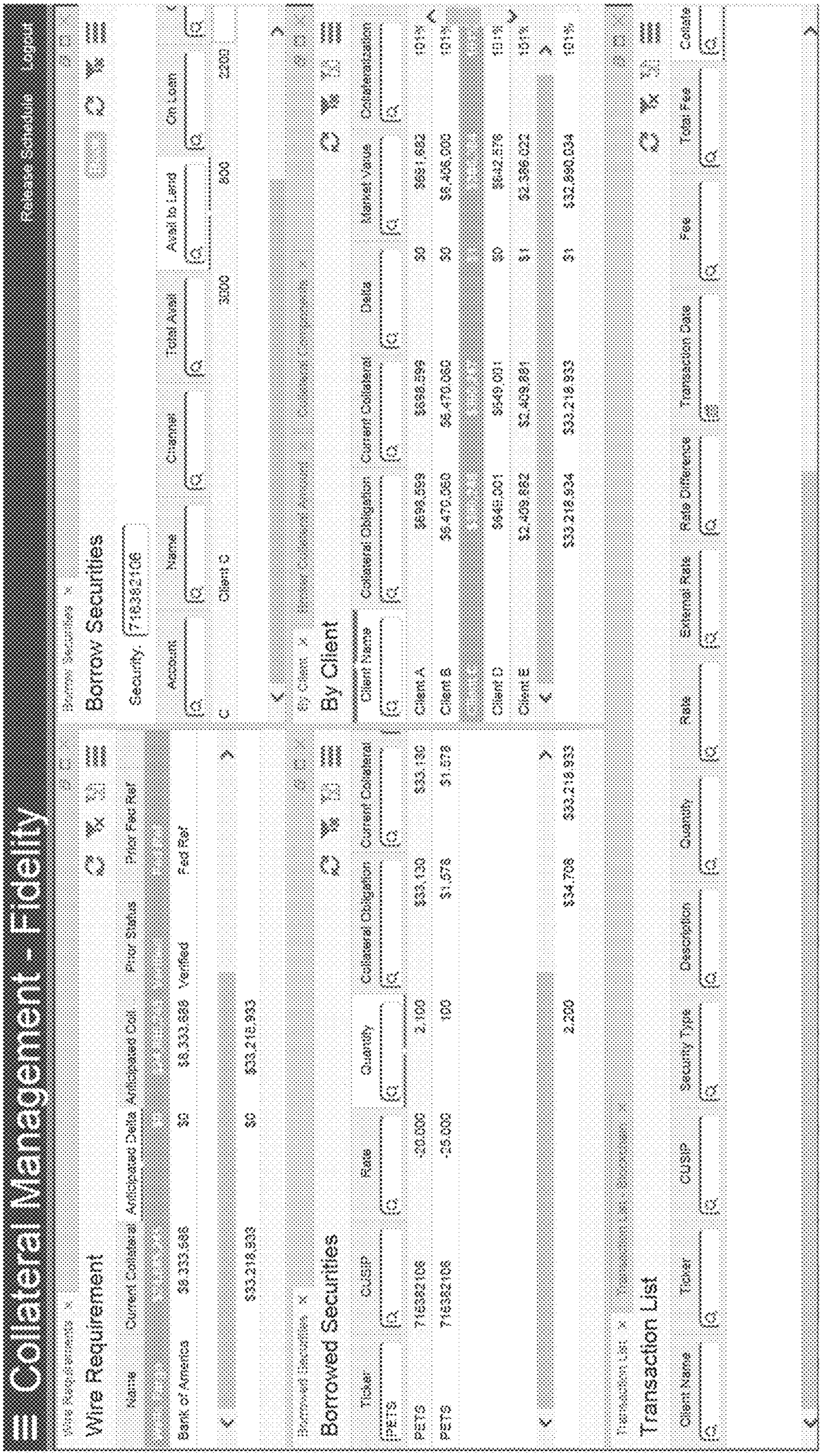

FIGURE 10: CMBSC SCREENSHOT
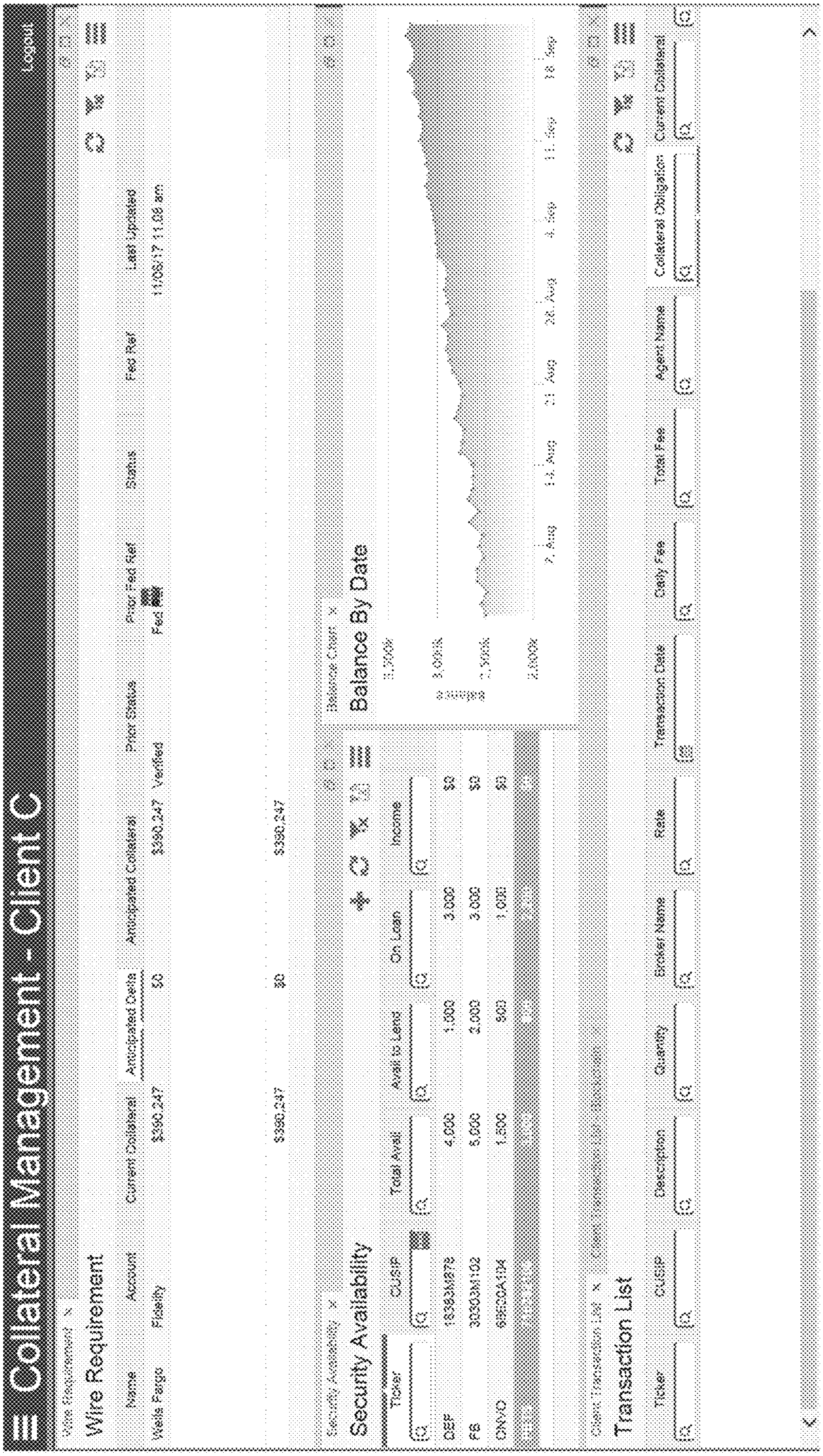

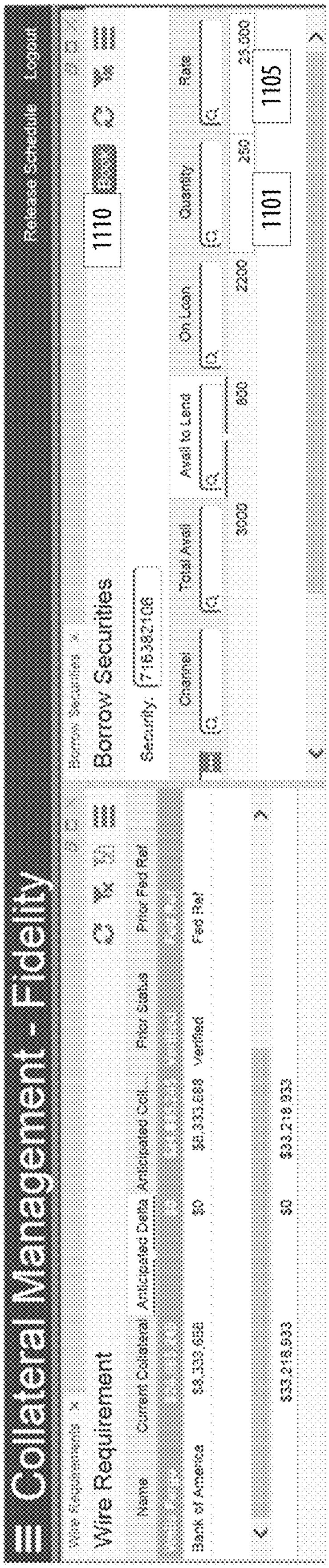
FIGURE 11: CMBSC SCREENSHOT

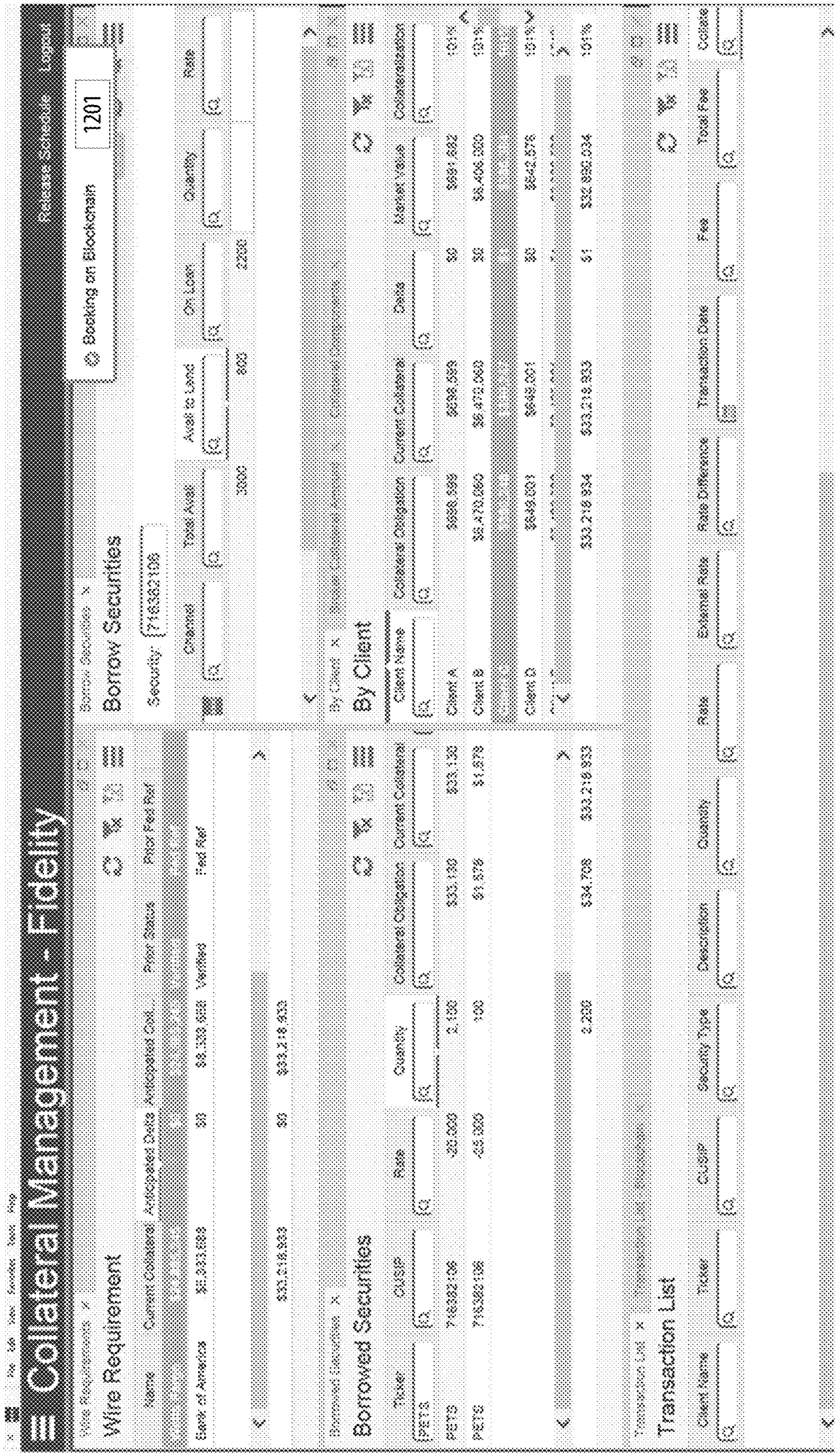
FIGURE 12: CMBSC SCREENSHOT

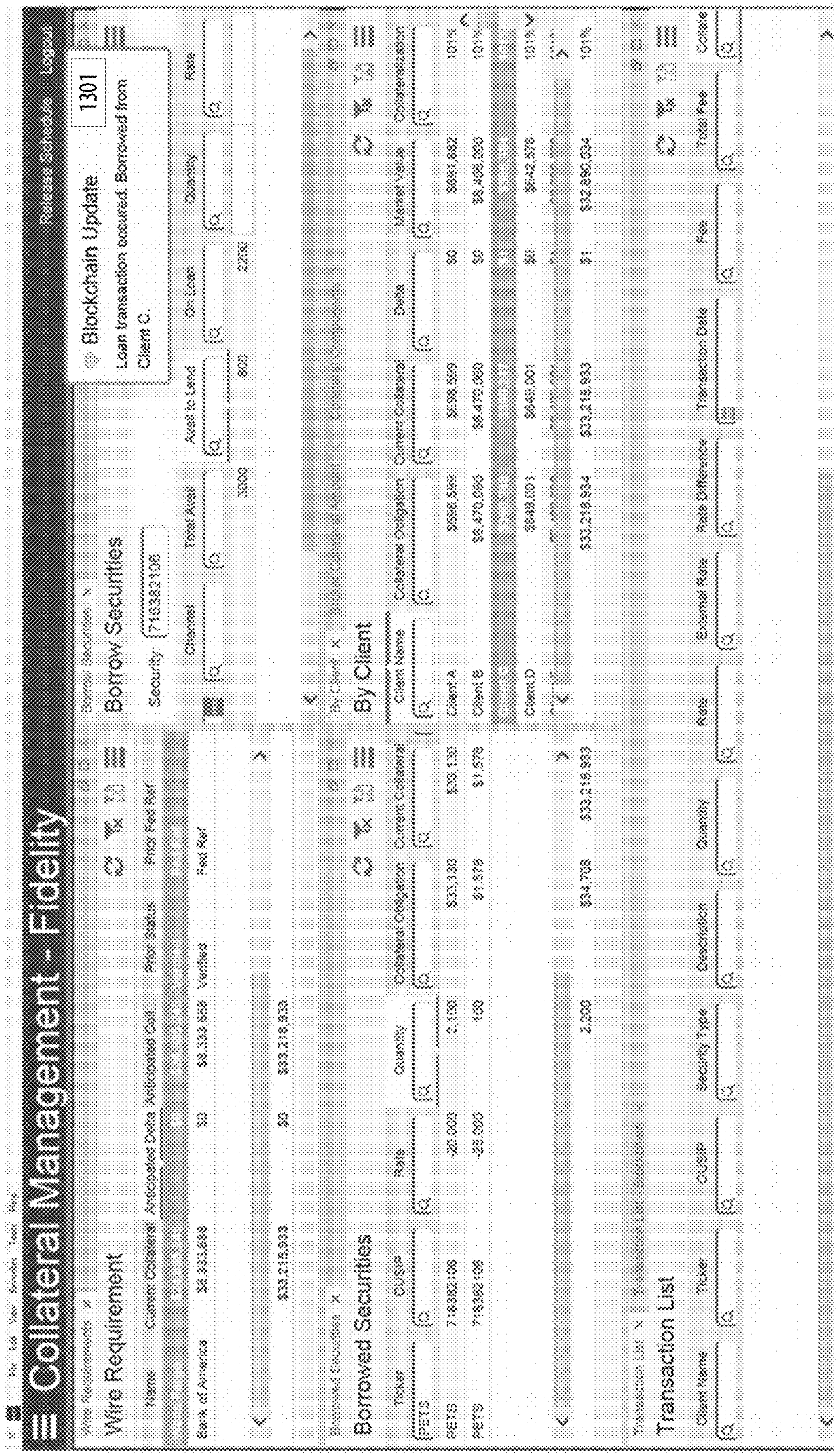
FIGURE 13: CMBSC SCREENSHOT

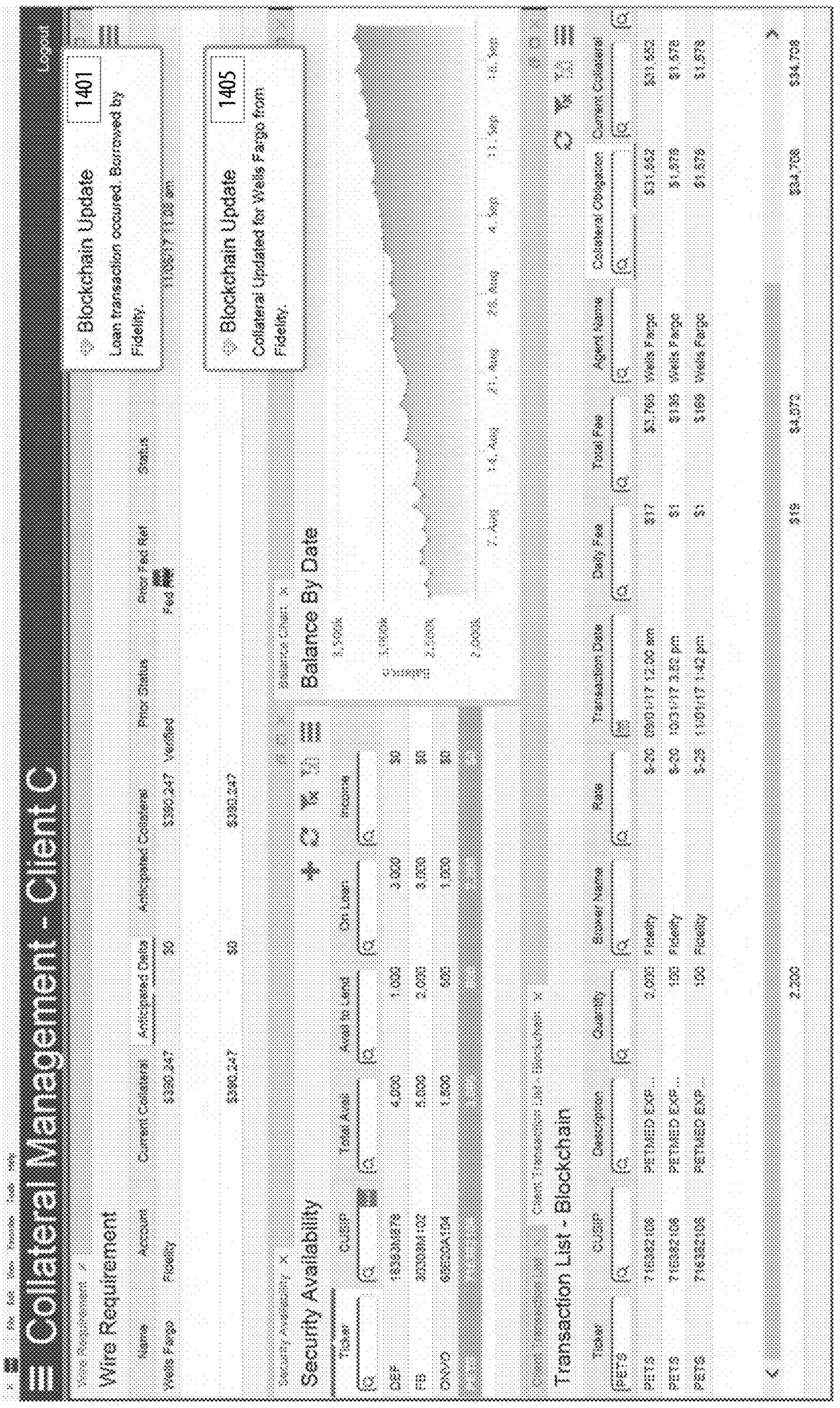
FIGURE 14: CMBSC SCREENSHOT

FIGURE 15: CMBSC SCREENSHOT
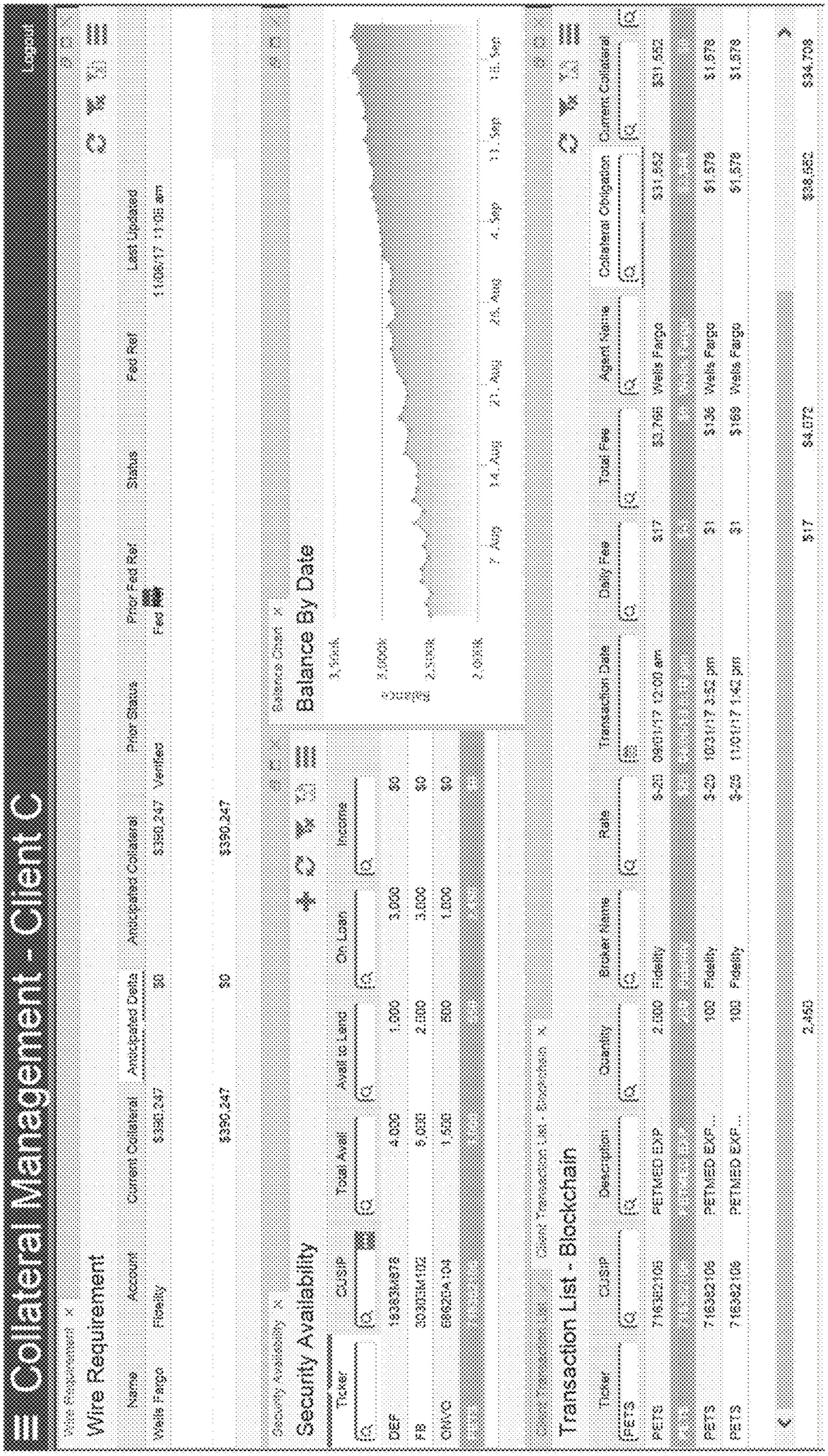

FIGURE 16: CMBSC SCREENSHOT
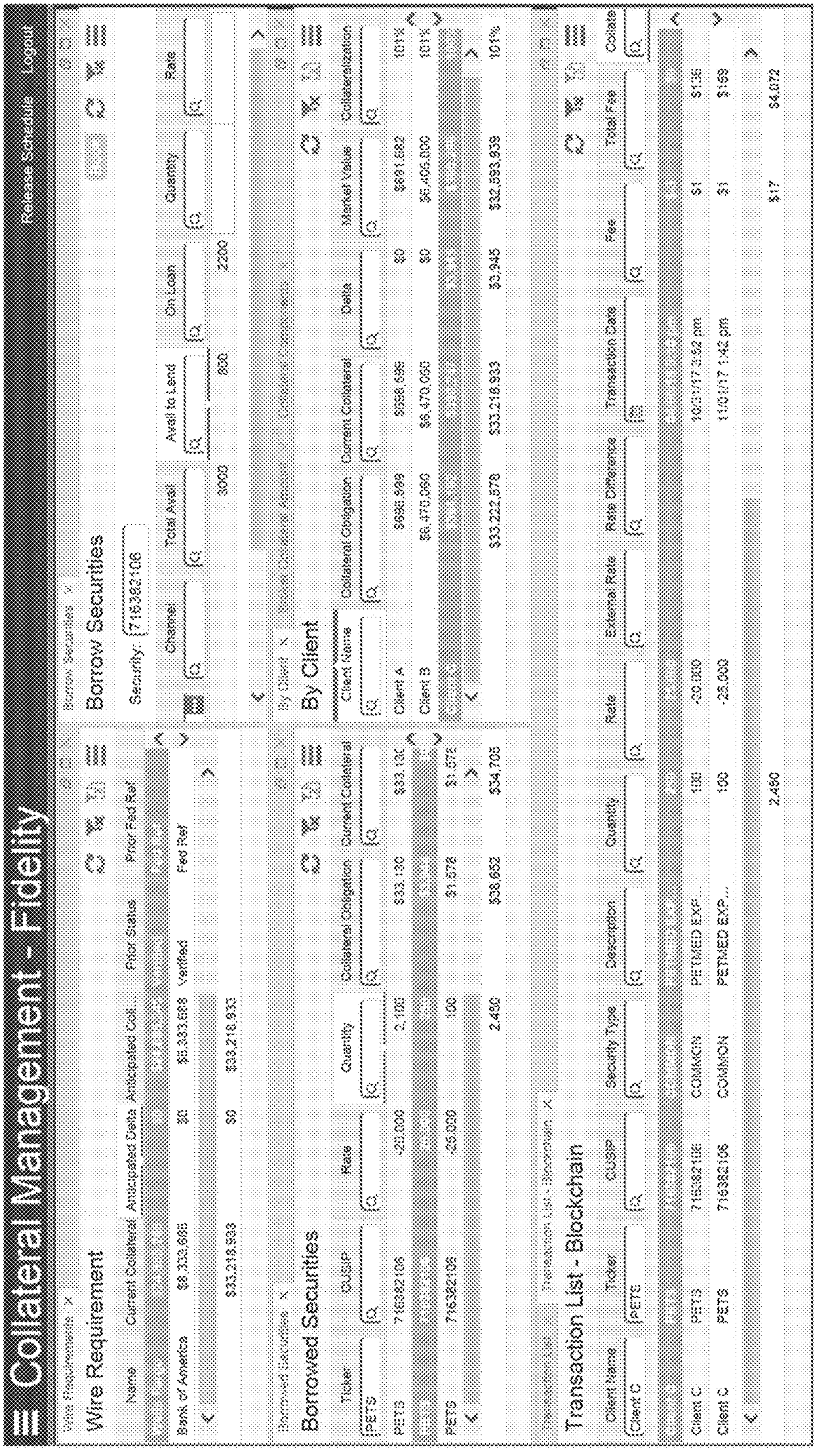

FIGURE 17: CMBSC SCREENSHOT
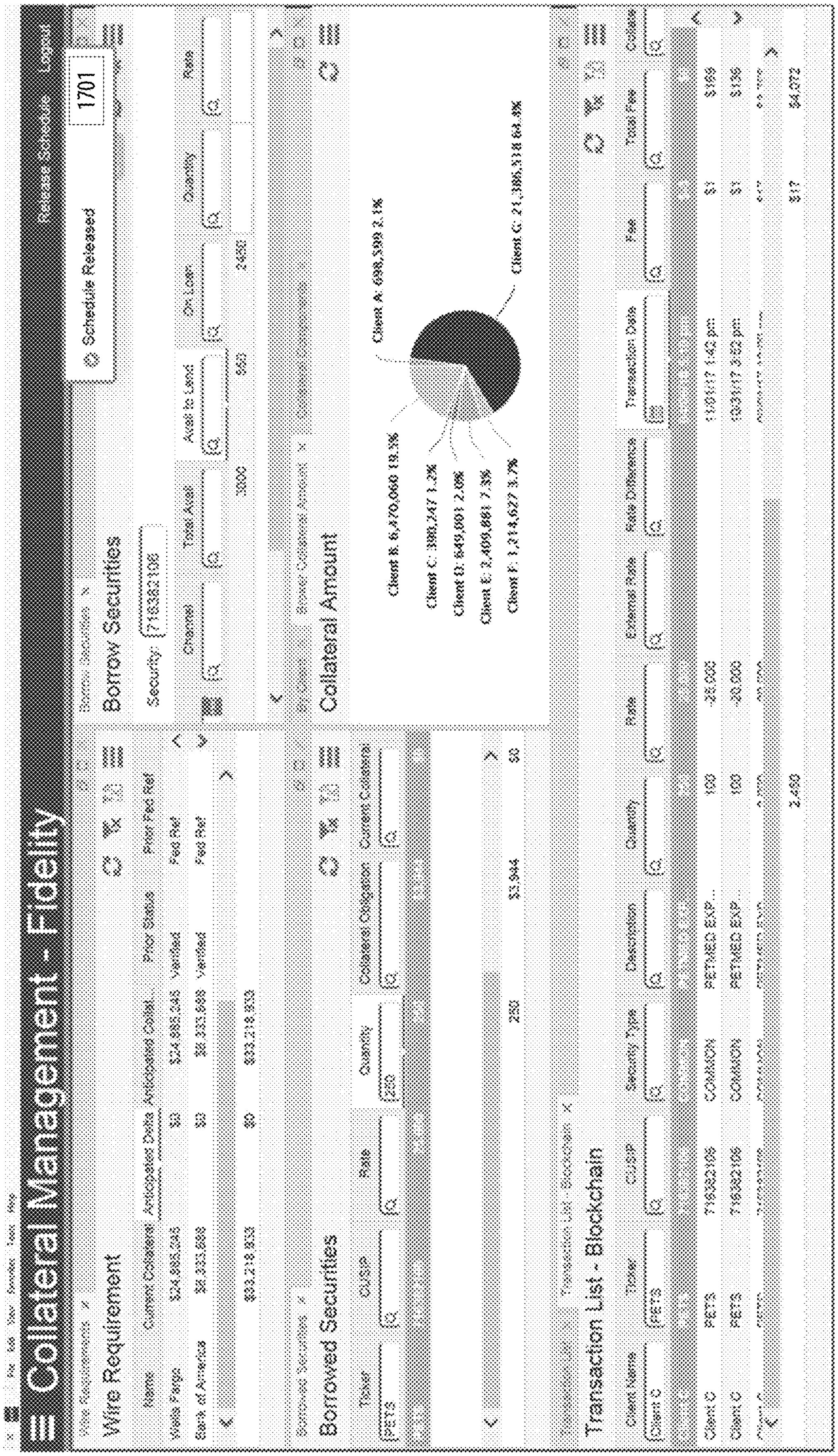

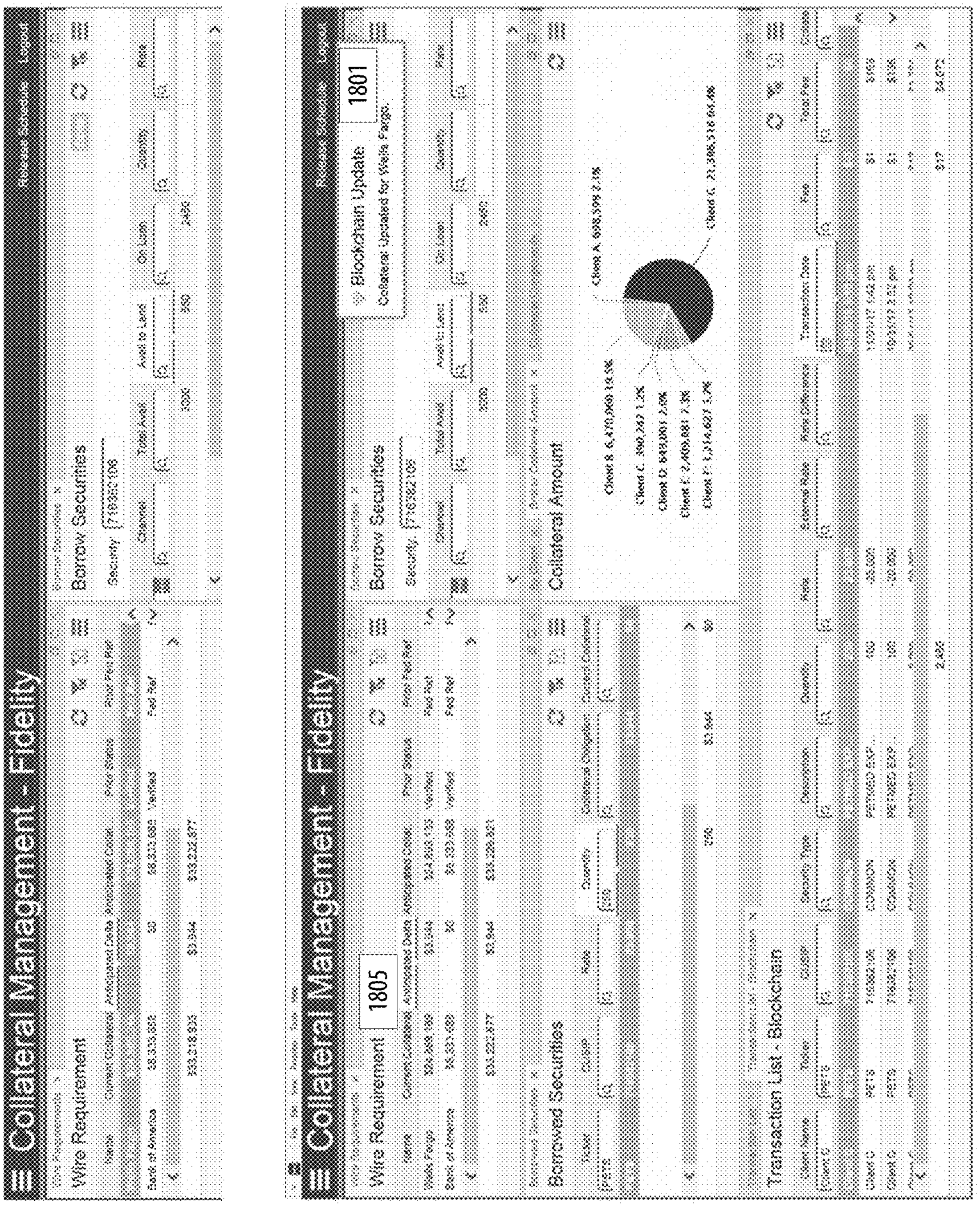
FIGURE 18: CMBSC SCREENSHOT

Collateral Management - Client C
Wire Requirement
Blockchain Update
Collateral Updated for Wells Fargo from Fidelity.
1901
Security Availability
Balance By Date
Transaction List - Blockchain
Collateral Management - Client C
Wire Requirement
1905

FIGURE 19: CMBSC SCREENSHOT

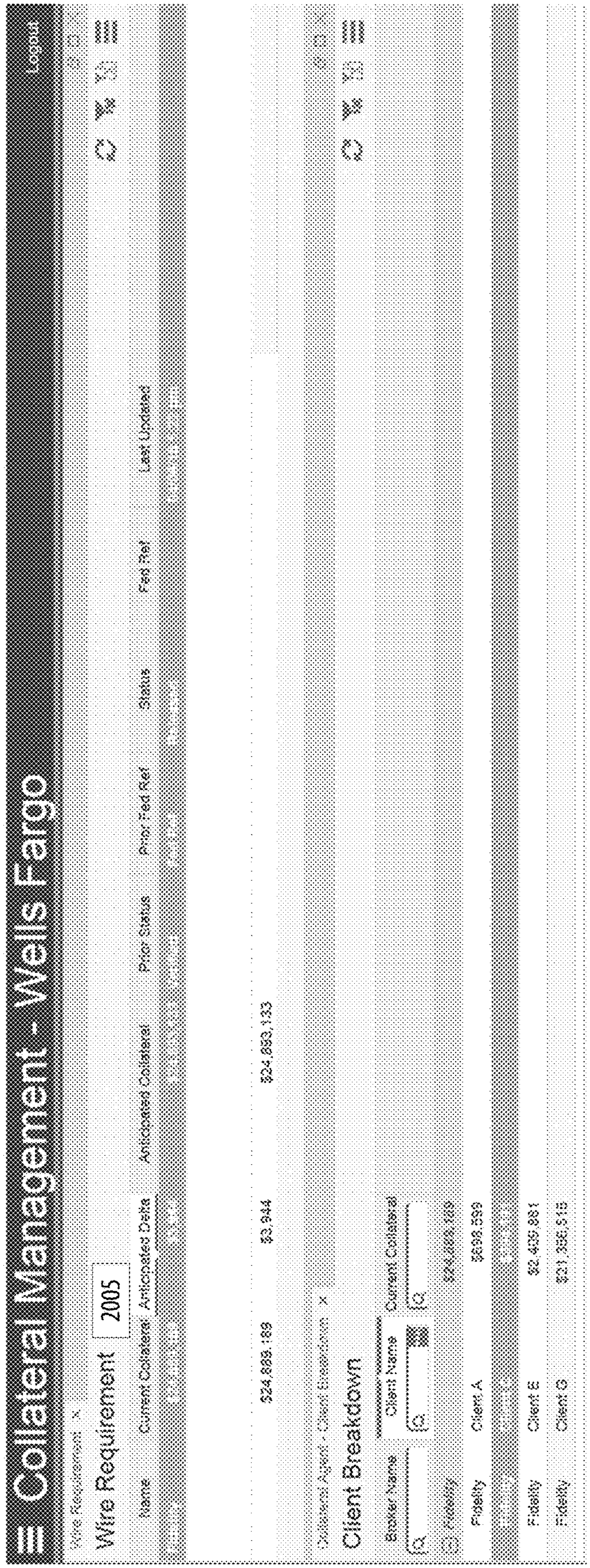
FIGURE 20: CMBSC SCREENSHOT

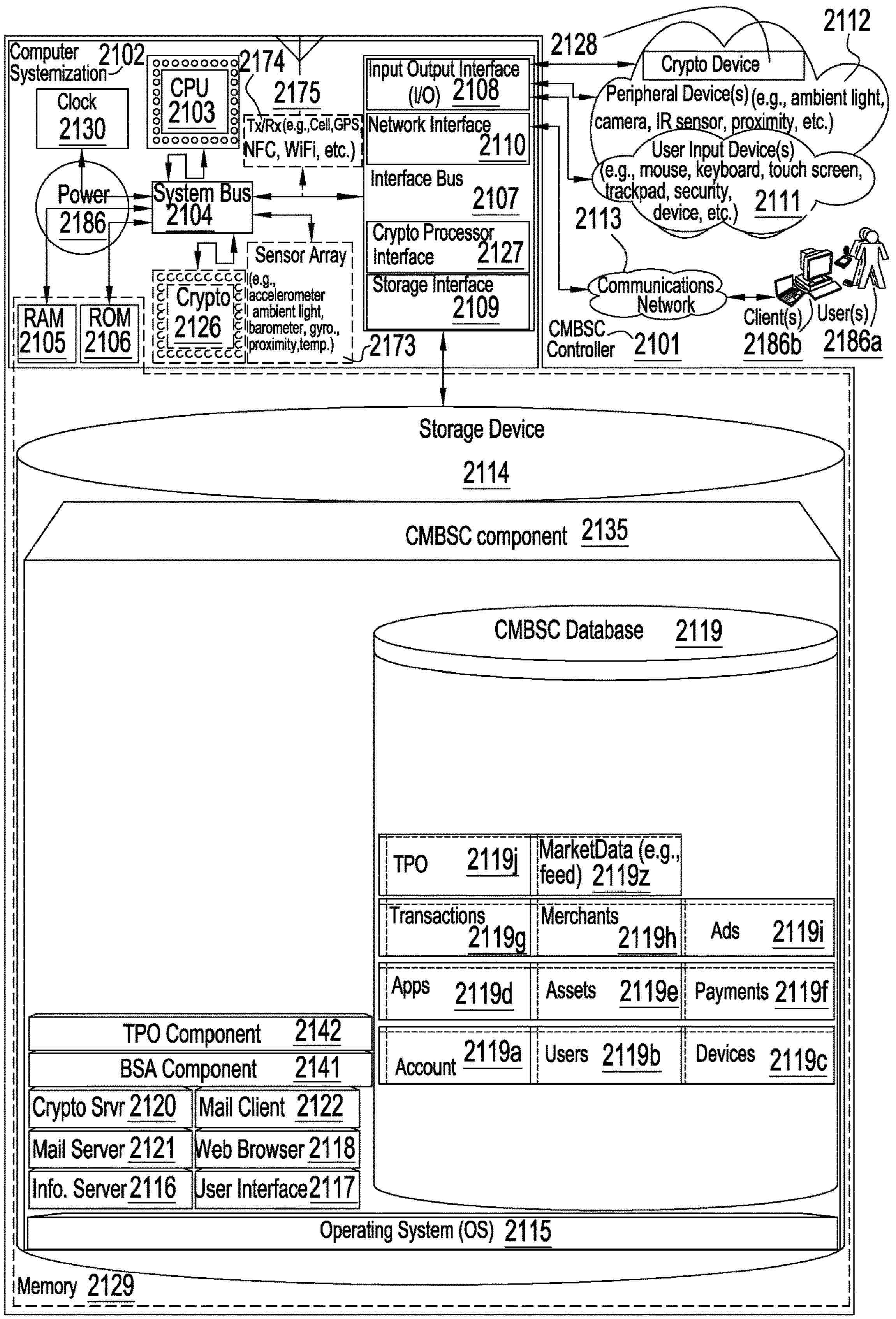
FIGURE 21: CMBSC Controller

COLLATERAL MANAGEMENT WITH BLOCKCHAIN AND SMART CONTRACTS APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

Applicant hereby claims benefit to priority under 35 USC § 120 as a continuation-in-part of: U.S. patent application Ser. No. 15/898,220, filed Feb. 15, 2018, entitled "Asynchronous Crypto Asset Transfer and Social Aggregating, Fractionally Efficient Transfer Guidance, Conditional Triggered Transaction, Datastructures, Apparatuses, Methods and Systems"; and which in turn:

- claims benefit to priority under 35 USC § 120 as a continuation-in-part of: U.S. patent application Ser. No. 15/210,813, filed Jul. 14, 2016, entitled "Crypto Key Recovery and Social Aggregating, Fractionally Efficient Transfer Guidance, Conditional Triggered Transaction, Datastructures, Apparatuses, Methods and Systems," and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems,"
- claims benefit to priority under 35 USC § 120 as a continuation-in-part of: U.S. patent application Ser. No. 15/210,817, filed Jul. 14, 2016, entitled "Crypto Voting and Social Aggregating, Fractionally Efficient Transfer Guidance, Conditional Triggered Transaction, Datastructures, Apparatuses, Methods and Systems," and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems,"

- claims benefit to priority under 35 USC § 120 as a continuation-in-part of: U.S. patent application Ser. No. 15/210,807, filed Jul. 14, 2016, entitled "Smart Rules and Social Aggregating, Fractionally Efficient Transfer Guidance, Conditional Triggered Transaction, Datastructures, Apparatuses, Methods and Systems," and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems,"
- claims benefit to priority under 35 USC § 120 as a continuation-in-part of: U.S. patent application Ser. No. 15/210,795, filed Jul. 14, 2016, entitled "Social Aggregating, Fractionally Efficient Transfer Guidance, Conditional Triggered Transaction, Datastructures, Apparatuses, Methods and Systems," and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems,"

claims benefit to priority under 35 USC § 120 as a continuation-in-part of: U.S. patent application Ser. No. 15/210,821, filed Jul. 14, 2016, entitled "Crypto Captcha and Social Aggregating, Fractionally Efficient Transfer Guidance, Conditional Triggered Transaction, Datastructures, Apparatuses, Methods and Systems," and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems,"

claims benefit to priority under 35 USC § 120 as a continuation-in-part of: U.S. patent application Ser. No. 14/799,282, filed Jul. 14, 2015, entitled "Point-to-Point Transaction Guidance Apparatuses, Methods and Systems,"

claims benefit to priority under 35 USC § 120 as a continuation-in-part of: U.S. patent application Ser. No. 14/799,242, filed Jul. 14, 2015, entitled "Point-to-Point Transaction Guidance Apparatuses, Methods and Systems,"

claims benefit to priority under 35 USC § 120 as a continuation-in-part of: U.S. patent application Ser. No. 14/799,229, filed Jul. 14, 2015, entitled "Point-to-Point Transaction Guidance Apparatuses, Methods and Systems,"

claims benefit to priority under 35 USC § 120 as a continuation-in-part of: U.S. patent application Ser. No. 14/963,165, filed Dec. 8, 2015, entitled "Social Aggregated Fractional Equity Transaction Partitioned Acquisition Apparatuses, Methods and Systems,"

claims benefit to priority under 35 USC § 120 as a continuation-in-part of: U.S. patent application Ser. No. 15/019,926, filed Feb. 9, 2016, entitled "Computationally Efficient Transfer Processing and Auditing Apparatuses, Methods and Systems,"

claims benefit to priority under 35 USC § 120 as a continuation-in-part of: U.S. patent application Ser. No. 15/209,701, filed Jul. 13, 2016, entitled "Point-to-Point Transaction Guidance Apparatuses, Methods and Systems,"

claims benefit to priority under 35 USC § 120 as a continuation-in-part of: U.S. patent application Ser. No. 15/209,709, filed Jul. 13, 2016, entitled "Point-to-Point Transaction Guidance Apparatuses, Methods and Systems,"

claims benefit to priority under 35 USC § 120 as a continuation-in-part of: U.S. patent application Ser. No. 15/209,714, filed Jul. 13, 2016, entitled "Point-to-Point Transaction Guidance Apparatuses, Methods and Systems,"

claims benefit to priority under 35 USC § 120 as a continuation-in-part of: Patent Cooperation Treaty application serial no. PCT/US16/42169, filed Jul. 13, 2016, entitled "Computationally Efficient Transfer Processing, Auditing, and Search Apparatuses, Methods and Systems,"

claims benefit to priority under 35 USC § 120 as a continuation-in-part of: U.S. patent application Ser. No. 15/210,781, filed Jul. 14, 2016, entitled "Computationally Efficient Transfer Processing, Auditing, and Search Apparatuses, Methods and Systems,"

claims benefit to priority under 35 USC § 120 as a continuation-in-part of: U.S. patent application Ser. No. 15/486,243, filed Apr. 12, 2017, entitled "Computationally Efficient Transfer Processing, Auditing, and Search Apparatuses, Methods and Systems,"

claims benefit to priority under 35 USC § 120 as a continuation-in-part of: U.S. patent application Ser. No. 15/844,375, filed Dec. 15, 2017, entitled "Social Data Tracking Datastructures, Apparatuses, Methods and Systems,"

claims benefit to priority under 35 USC § 120 as a continuation-in-part of: U.S. patent application Ser. No. 15/844,404, filed Dec. 15, 2017, entitled "Social Data Tracking Datastructures, Apparatuses, Methods and Systems,"

claims benefit to priority under 35 USC § 120 as a continuation-in-part of: U.S. patent application Ser. No. 15/844,387, filed Dec. 15, 2017, entitled "Social Data Tracking Datastructures, Apparatuses, Methods and Systems."

The entire contents of the aforementioned applications are herein expressly incorporated by reference.

FIELD

The present innovations generally address information technology, and more particularly, include Collateral Management with Blockchain and Smart Contracts Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

A blockchain is a continuously growing list of records, called blocks, which are linked and secured using cryptography. For use as a distributed ledger, a blockchain is typically managed by a peer-to-peer network collectively adhering to a protocol for validating new blocks. A blockchain can record transactions between parties without needing to trust counterparties or separate intermediaries.

BRIEF DESCRIPTION OF THE DRAWINGS

Appendices and/or drawings illustrating various, non-limiting, example, innovative aspects of the Collateral Management with Blockchain and Smart Contracts Apparatuses, Methods and Systems (hereinafter "CMBSC") disclosure, include:

FIG. 1 shows an architecture for the CMBSC;

FIG. 2 shows an architecture for the CMBSC;

FIG. 3 shows implementation case(s) for the CMBSC;

FIG. 4 shows a datagraph illustrating data flow(s) for the CMBSC;

FIG. 5 shows a datagraph illustrating data flow(s) for the CMBSC;

FIG. 6A shows a logic flow illustrating embodiments of a blockchain sync adapter (BSA) component for the CMBSC;

FIG. 6B shows a logic flow illustrating embodiments of a transaction process optimizer (TPO) component for the CMBSC;

FIG. 7 shows a screenshot for the CMBSC;

FIG. 8 shows a screenshot illustrating user interface(s) of the CMBSC;

FIG. 9 shows a screenshot illustrating user interface(s) of the CMBSC;

FIG. 10 shows a screenshot illustrating user interface(s) of the CMBSC;

FIG. 11 shows a screenshot illustrating user interface(s) of the CMBSC;

FIG. 12 shows a screenshot illustrating user interface(s) of the CMBSC;

FIG. 13 shows a screenshot illustrating user interface(s) of the CMBSC;

FIG. 14 shows a screenshot illustrating user interface(s) of the CMBSC;

FIG. 15 shows a screenshot illustrating user interface(s) of the CMBSC;

FIG. 16 shows a screenshot illustrating user interface(s) of the CMBSC;

FIG. 17 shows a screenshot illustrating user interface(s) of the CMBSC;

FIG. 18 shows a screenshot illustrating user interface(s) of the CMBSC;

FIG. 19 shows a screenshot illustrating user interface(s) of the CMBSC;

FIG. 20 shows a screenshot illustrating user interface(s) of the CMBSC;

FIG. 21 shows a block diagram illustrating embodiments of a CMBSC controller;

APPENDICES 1-2 ILLUSTRATE EMBODIMENTS OF THE CMBSC

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Collateral Management with Blockchain and Smart Contracts Apparatuses, Methods and Systems (hereinafter "CMBSC") transforms borrow transaction request inputs, via CMBSC components (e.g., BSA, TPO, etc. components), into borrow transaction init notification, borrow transaction sync notification outputs. The CMBSC components, in various embodiments, implement advantageous features asset forth below.

INTRODUCTION

Examples of Features

The following features (e.g., collateral, fully paid securities, enrolling in fully paid program, fully paid collateral management, participants in fully paid collateral management process, blockchain, user interface, middle tier, data tier, etc.) may be used by the CMBSC, and are non-limiting example expressions of such features discussed herein provided to aid in the understanding.

Collateral

Collateral is an asset pledged by a borrower to a lender, usually in return for a loan.

When borrowing securities (e.g., stocks) the borrower may post collateral to the lender, usually to the lender's account with a collateral agent, in exchange for the shares. Collateral is returned to the borrower when the shares are returned to the lender. The lender may have to pay any applicable interest on the collateral to the borrower.

When a broker-dealer such as Fidelity borrows security from a customer, the broker-dealer may pledge some amount of collateral (e.g., either equal to or greater than the market value of security) to the customer's collateral agent such as Bank of America or Wells Fargo Securities in the customer's account.

Fully Paid Securities

The term "fully paid securities" refers to securities held in a customer's margin or cash account that have been completely paid for and are not being pledged as collateral to support the purchase of other securities on margin. The term is relevant from a regulatory perspective as the SEC requires that U.S. broker-dealers segregate and maintain in a good control location (e.g., DTC or bank) all customer securities which are fully paid. Such securities cannot be pledged or loaned to finance the activities of the firm or other customers.

Enrolling in Fully Paid Program

When a customer enrolls in a broker-dealer's fully paid lending program, the customer can loan to the broker-dealer certain fully paid or excess-margin securities that the broker-dealer desires to borrow. The customer can sell loaned securities or end loans at any time.

Fully Paid Collateral Management

The process describes the management of collateral for fully paid securities in an enrolled customer's account. The customer's account may be held at a collateral agent. Collateral may get settled daily based on market value of securities (due to the daily price changes of the security).

Participants in Fully Paid Collateral Management Process

Participants may include:
Broker-dealer (Borrower)
Customer (Lender)
Collateral Agent (Custodian of Collateral)

Blockchain

A blockchain is a continuously growing list of records, called blocks, which are linked and secured using cryptography. Each block typically contains a cryptographic hash of the previous block, a timestamp and transaction data.

By design, a blockchain is inherently resistant to modification of the data. It is "an open, distributed ledger that can record transactions between two parties efficiently and in a verifiable and permanent way".

In one implementation, once recorded, the data in any given block cannot be altered retroactively without the alteration of all subsequent blocks.

User Interface (UI)

User Interface is responsible for the presentation of data and interacting with the user.

Middle Tier

Middle Tier provides the logic that contains the business rules, and also contains the code to interface with the data tier. This layer connects the User Interface and Data Storage by moving and processing data between both User Interface and Data Storage.

Data Tier (Data Storage Tier)

The data-tier is responsible for data storage and may be implemented using a relational database management system (RDBMS) such as SQL Server or Oracle.

CMBSC Introduction

Collateral management for fully paid securities is now a very complex process with interrelated functions involving multiple parties. Moreover, fully paid collateral management process is opaque and centralized with lack of real time visibility for the involved parties. This has led to a tedious manual process, wherein the brokers, collateral agents and fully paid customers have to constantly communicate and check-in using various forms of communication including email and phone calls for tracking purposes.

In various embodiments, the CMBSC is a unique approach which leverages the emerging Blockchain technology.

In this approach, each user can access the process online where they can track transactions in real time. The process also includes storing transactions on the Blockchain so that transactions can be stored in a decentralized manner where cyber security is stronger and no single party can make changes to the transaction once it is approved and confirmed by borrower and lender.

The CMBSC leverages a combination of on-chain and off-chain storage functionality as Blockchain is inherently slow and can take some time for the transaction to be included in a block; with the CMBSC approach, the process is made faster.

In one implementation, transactional & critical data is included on the Blockchain (on-chain) and the rest of the data is stored on distributed servers (off-chain).

Transactional data attributes may include the following: quantity of the security, rate of the security, ID of the security (Ticker, Cusip, Sedol and ISIN), timestamp of the transaction, etc.

Static/non-transactional data attributes may include the following: company name, country, customer name and address, customer details, broker dealer details, collateral management address, etc.

Moreover, each view (Customer View, Broker-Dealer View, Regulator View and Custodian Agent View) may only be accessible to the appropriate participant. Balances held in each view and transaction amounts are shielded, ensuring financial privacy.

Example Advantages of the CMBSC

The CMBSC approach has multiple advantages, over the current process, some of which are listed below:

- System based data sharing (Data is complete, accurate and consistent with the members)
- Decentralization aspect of distributed aggregated database (e.g., Blockchain) preserves the trust and validity of the transaction data
- Transactions on a Blockchain are cryptographically secured and provide integrity
- As the system is based on various nodes in a peer-to-peer network, and the data is replicated and updated on each and every node, the system becomes highly available. Even if nodes leave the network or become inaccessible, the network as a whole continues to work, thus making it highly available.
- Customers can access independent reporting via User Interface on Blockchain
- Single transaction ID on Blockchain (the participants have the same record)
- Reduction in overhead cost as verification and reconciliation are minimal because a single version of agreed upon data is already available on a shared ledger between various counter parties.

CMBSC

FIG. 1 shows an architecture for the CMBSC. In FIG. 1, a user interface (UI) 102 may be used by various users (e.g., a customer, a broker-dealer, a collateral agent, a compliance officer) to interact with the CMBSC. A different view may be presented to each user. For example, the UI may be implemented using HTML5 and Angular application platform.

A middle tier 110 may be utilized to connect the UI with a data tier 120 and/or a blockchain 130. In one implementation, the middle tier may utilize Node.js JavaScript runtime environment 112 to execute JavaScript code. For example, the middle tier may include code that utilizes Web3.js Ethereum JavaScript API 114 to communicate with the blockchain (e.g., to provide push notifications to the UI based on blockchain activity). See Appendix 2 for an example of how events from a smart contract on the blockchain may be handled. In another example, the middle tier may include code that utilizes a data access object (DAO) 116 to communicate with the data tier (e.g., to process data and/or to store data in or retrieve data from databases).

In some embodiments, oracles can expand the capacity of smart contracts beyond the blockchain. In one implementation, the CMBSC may include a crowdsource (e.g., weather from smartphones) to inform a blockchain oracle to act as trigger for actions, with a list of options to, e.g., settle smart contracts like: restrict bitcoin wallet access, release extra key, buy stock, vote, etc. For example, if lots of sales of corn, buy counter stock/hedge. Or, for example, if lots of corn producers weather reports drought, buy corn futures.

The data tier may include a RDBMS 122 and a write once read many (WORM) database 124. For example, the RDBMS may include static/non-transactional data such as user profiles, price discovery, securities master, and/or the like. In another example, the WORM database may include transactional data.

The blockchain may be implemented using the Ethereum decentralized platform. For example, a smart contract, such as a collateral smart contract 132, and/or smart contract data, such as collateral data 134, may be stored and/or executed by the blockchain. Blockchain information may be viewed by users using blockchain UI 104. In one implementation, the smart contract may be written using Solidity programming language. See Appendix 1 for an example of an Ethereum smart contract written using Solidity programming language that may be utilized. A cloud-to-cloud migration (C2C) Virtual Server box may be used to host Ethereum private network and/or Ethereum miners/nodes. Further, the C2C Virtual Server box may be used to host CMBSC components (e.g., UI, middle tier, data tier).

A blockchain sync adaptor (BSA) component 140 may be utilized to synchronize transactional data to the blockchain as instructed by a transaction process optimizer (TPO) component 150. For example, the BSA component and/or the TPO component may be implemented in JavaScript and may be executed using Node.js JavaScript run-time environment. In one implementation, the TPO component may be configured based on parameters 152 such as time (e.g., based on minutes since the last sync, based on minutes since a transaction was executed), risk (e.g., based on the amount of dollars at risk), cost (e.g., based on the amount of dollars associated with cost), and/or the like.

FIG. 2 shows an architecture for the CMBSC. In FIG. 2, a user interface (UI) 202 may be used by various users (e.g., a lender, a broker-dealer, a compliance officer) to interact with the CMBSC. A different view may be presented to each user. For example, the UI may be implemented using HTML5 and Angular application platform.

A middle tier 210 may be utilized to connect the UI with a data tier 220 and/or a blockchain 230. In one implementation, the middle tier may utilize Node.js JavaScript runtime environment 212 to execute JavaScript code. For example, the middle tier may include code that utilizes Web3.js Ethereum JavaScript API 214 to communicate with the blockchain (e.g., to provide push notifications to the UI based on blockchain events, to store transactions on the blockchain). See Appendix 2 for an example of how events from a smart contract on the blockchain may be handled. In another example, the middle tier may include code that utilizes a data access object (DAO) 216 to communicate with the data tier (e.g., to process data and/or to store data in or retrieve data from databases).

In some embodiments, oracles can expand the capacity of smart contracts beyond the blockchain. In one implementation, the CMBSC may include a crowdsource (e.g., weather from smartphones) to inform a blockchain oracle to act as trigger for actions, with a list of options to, e.g., settle smart contracts like: restrict bitcoin wallet access, release extra key, buy stock, vote, etc. For example, if lots of sales of corn, buy counter stock/hedge. Or, for example, if lots of corn producers weather reports drought, buy corn futures.

In one implementation, the middle tier may include a blockchain sync adaptor (BSA) component utilized to synchronize transactional data to the blockchain as instructed by a transaction process optimizer (TPO) component. For example, the BSA component and/or the TPO component may be implemented in JavaScript and may utilize Web3.js Ethereum JavaScript API and/or the DAO. In one implementation, the TPO component may be configured based on parameters such as time (e.g., based on minutes since the last sync, based on minutes since a transaction was executed), risk (e.g., based on the amount of dollars at risk), cost (e.g., based on the amount of dollars associated with cost), and/or the like.

The data tier may include a database 222 (e.g., an Oracle database). For example, the database may include data such as user profiles, availability (e.g., of securities to borrow), locates status, price discovery, other off-chain data such as calculation intensive processing login (e.g., order book), and/or the like.

The blockchain may be implemented using the Ethereum decentralized platform. For example, a smart contract 232 and/or locates data 234 (e.g., digitized assets such as securities like TSLA) may be stored and/or executed by the blockchain. Blockchain information may be viewed by users using blockchain UI 204. In one implementation, the smart contract may be written using Solidity programming language. See Appendix 1 for an example of an Ethereum smart contract written using Solidity programming language that may be utilized. A C2C Virtual Server box may be used to host Ethereum private network and/or Ethereum miners/nodes. Further, the C2C Virtual Server box may be used to host CMBSC components (e.g., UI, middle tier, data tier).

FIG. 3 shows implementation case(s) for the CMBSC. In FIG. 3, an exemplary transaction workflow for a borrow transaction is illustrated. At 301, a broker-dealer may initiate a borrow transaction to borrow 100 shares of TSLA from a fully paid customer (e.g., Customer A who enrolled in a broker-dealer's fully paid lending program) at a 10% rate. For example, the broker-dealer may utilize an application UI to initiate the borrow transaction. In one implementation, collateral for the borrow transaction may be calculated based on the last (e.g., yesterday's) closing price. In another implementation, collateral for the borrow transaction may be calculated based on the end-of-day (e.g., today's) closing price.

At 302, transaction details flow from the UI into a data tier (e.g., Oracle database) through a middle tier. In one implementation, the middle tier may connect the UI and the data tier by moving and processing data between both the UI and the data tier. The middle tier may utilize Node.js JavaScript run-time environment to execute JavaScript code.

At 303, transaction details for the borrow transaction may flow from a RDBMS (e.g., an Oracle database) into a WORM database. Transaction details are added to the Ethereum Blockchain based on TPO component rules. In one embodiment, the TPO component optimizes data load into the blockchain. In one implementation, the TPO component is configured to decide the timing of regular data load (e.g., based on average time, average amount of total transactions, and/or the like) into the blockchain. For example, the TPO component may keep a running count of time, risk, cost, and/or the like based on transaction details of incoming borrow transactions, and, based on the TPO component configuration settings, may signal a BSA component to synchronize (sync) transactions to the blockchain.

At 304, the BSA component may send the borrow transactions to sync to the blockchain. Non-transactional details (e.g., TSLA name, company headquarters address, the customer's details, the broker-dealer's details) may be replicated onto distributed servers (e.g., the WORM database) where a collateral agent and the broker dealer both can access this data.

At 305, transactional details (attributes) of the borrow transactions to sync are added to the Ethereum Blockchain. Ethereum Blockchain network comprises of various nodes which can include broker dealers and collateral agents.

FIG. 4 shows a datagraph illustrating data flow(s) for the CMBSC. In FIG. 4, a user 401 (e.g., a broker-dealer) may initiate a security search 420 to determine clients from which the broker-dealer may borrow TSLA shares. The user may utilize a user interface 402 (e.g., via the user's client device) to input parameters of the security search. The user interface may communicate with middleware 406 to look up availability of TSLA shares from a database 410 (e.g., a RDBMS). The results of the security search may be presented to the user via the user interface. For example, the user may be informed that 500 TSLA shares are available from Customer A and 1000 TSLA share are available from Customer B. In one implementation, the user may be able to see customers holding the security, prior borrow of the security by the broker-dealer (on loan quantity), current quantity of the security for each customer (available to lend quantity), and/or the like.

The broker-dealer may initiate booking a borrow transaction 430. For example, the broker-dealer may wish to borrow 100 shares of TSLA from Customer A. The user may utilize the user interface to input parameters of the borrow transaction. In one implementation, the user may be able to specify the number of shares the user wishes to borrow, the rate at which the trader wishes to borrow shares, and/or the like. The user interface may communicate with the middleware to store details of the borrow transaction in the database and/or a WORM database 414. A confirmation that the borrow transaction was booked may be presented to the user via the user interface.

A blockchain sync adapter component 407 may sync details of the borrow transaction (e.g., based on data stored in the WORM database) to the Ethereum Blockchain 418 upon receiving a blockchain sync event 440 from a transaction process optimizer component 408. In one implementation, a set of on-chain attributes and a hash of off-chain attributes (e.g., computed using a SHA-256 hashing function) may be stored on the Ethereum Blockchain. A confirmation that the borrow transaction was stored on the blockchain may be presented to the user via the user interface.

FIG. 5 shows a datagraph illustrating data flow(s) for the CMBSC. In FIG. 5, a client 502 (e.g., of a user) may send an availability lookup request 521 to a CMBSC server 506 to initiate a security search. For example, the client may be a desktop, a laptop, a tablet, a smartphone, and/or the like that is executing a client application. In one implementation, the availability lookup request may include data such as a request identifier, a request type, a security identifier, and/or the like. In one embodiment, the client may provide the following example availability lookup request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth__request>
   <timestamp>2020-12-31 23:59:59</timestamp>
   <user__accounts__details>
         <user__account__credentials>
               <user__name>JohnDaDoeDoeDoooe@gmail.com</user__name>
               <password>abc123</password>
               //OPTIONAL <cookie>cookieID</cookie>
               //OPTIONAL <digital__cert__link>www.mydigitalcertificate.com/
JohnDoeDaDoeDoe@gmail.com/mycertifcate.dc</digital__cert__link>
               //OPTIONAL <digital__certificate>__DATA__</digital__certificate>
         </user__account__credentials>
   </user__accounts__details>
   <client__details> //iOS Client with App and Webkit
               //it should be noted that although several client details
               //sections are provided to show example variants of client
               //sources, further messages will include only on to save
               //space
         <client__IP>10.0.0.123</client__IP>
         <user__agent__string>Mozilla/5.0 (iPhone; CPU iPhone OS 7__1__1 like Mac
OS X) AppleWebKit/537.51.2 (KHTML, like Gecko) Version/7.0 Mobile/11D201
Safari/9537.53</user__agent__string>
         <client__product__type>iPhone6,1</client__product__type>
         <client__serial__number>DNXXX1X1XXXX</client__serial__number>
         <client__UDID>3XXXXXXXXXXXXXXXXXXXXXXXXD</client__UDID>
         <client__OS>iOS</client__OS>
         <client__OS__version>7.1.1</client__OS__version>
         <client__app__type>app with webkit</client__app__type>
         <app__installed__flag>true</app__installed__flag>
         <app__name>CMBSC.app</app__name>
         <app__version>1.0 </app__version>
         <app__webkit__name>Mobile Safari</client__webkit__name>
```

-continued

```
            <client_version>537.51.2</client_version>
    </client_details>
    <client_details> //iOS Client with Webbrowser
            <client_IP>10.0.0.123</client_IP>
            <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>web browser</client_app_type>
            <client_name>Mobile Safari</client_name>
            <client_version>9537.53</client_version>
    </client_details>
    <client_details> //Android Client with Webbrowser
            <client_IP>10.0.0.123</client_IP>
            <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
            <client_product_type>Nexus S</client_product_type>
            <client_serial_number>YXXXXXXXXZ</client_serial_number>
            <client_UDID>FXXXXXXXXX-XXXX-XXXX-XXXX-XXXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
    </client_details>
    <client_details> //Mac Desktop with Webbrowser
            <client_IP>10.0.0.123</client_IP>
            <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
            <client_product_type>MacPro5,1</client_product_type>
            <client_serial_number>YXXXXXXXXZ</client_serial_number>
            <client_UDID>FXXXXXXXXX-XXXX-XXXX-XXXX-XXXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
        </client_details>
        <availability_lookup_request>
            <request_identifier>ID_request_1</request_identifier>
            <request_type>FULLY_PAID_SECURITIES_TO_BORROW</request_type>
            <security_identifier>PETS</security_identifier>
        </availability_lookup_request>
    </auth_request>
```

The CMBSC server may send an availability data request 525 to a database 510 (e.g., a RDBMS) to facilitate the security search. In one embodiment, the CMBSC server may provide the following example availability data request, substantially in the form of a PHP/SQL listing, as provided below:

```
<?PHP
header('Content-Type: text/plain');
mysql_connect("254.93.179.112",$DBserver,$password); // access database server
mysql_select_db("CUSTOMERS.SQL"); // select database to search
//create query
$query = "SELECT accountID, accountOwnerID, assetQuantity FROM Accounts
  WHERE assetIDs LIKE 'PETS' AND accountEnrolledInFullyPaidSecurities = TRUE";
$result = mysql_query($query); // perform the search query
mysql_close("CUSTOMERS.SQL"); // close database access
?>
```

The database may send an availability data response 529 to the CMBSC server with the requested availability data.

The CMBSC server may send an availability lookup response 533 to the client to inform the user regarding customers from which the desired security may be borrowed and/or to facilitate borrowing the security. In one implementation, the availability lookup response may include data such as a response identifier, availability data, and/or the like. In one embodiment, the CMBSC server may provide the following example availability lookup response, substantially in the form of a HTTP(S) POST message including XML-formatted data, as provided below:

```
POST /availability_lookup_response.php HTTP/1.1
Host: www.server.com
Content-Type: Application/XML
Content-Length: 667
<?XML version = "1.0" encoding = "UTF-8"?>
<availability_lookup_response>
  <response_identifier>ID_response_1</response_identifier>
  <availability_data>
        <security_identifier>PETS</security_identifier>
        <account>
              <account_identifier>ID_account_1
              </account_identifier>
              <account_owner_identifier>Customer A
              </account_owner_identifier>
              <available_quantity>500</available_quantity>
        </account>
        <account>
              <account_identifier>ID_account_2
              </account_identifier>
              <account_owner_identifier>Customer B
              </account_owner_identifier>
              <available_quantity>1000</available_quantity>
        </account>
  </availability_data>
</availability_lookup_response>
```

The client may send a borrow transaction request 537 to the CMBSC server to initiate a borrow transaction. In one implementation, the borrow transaction request may include data such as a request identifier, a transaction identifier, a customer account identifier, a security identifier, a quantity to borrow, and/or the like. In one embodiment, the client may provide the following example borrow transaction request, substantially in the form of a HTTP(S) POST message including XML-formatted data, as provided below:

```
POST /borrow_transaction_request.php HTTP/1.1
Host: www.server.com
Content-Type: Application/XML
Content-Length: 667
<?XML version = "1.0" encoding = "UTF-8"?>
<borrow_transaction_request>
  <request_identifier>ID_request_2</request_identifier>
  <transaction_identifier>ID_transaction_1</transaction_identifier>
  <account_identifier>ID_account_1</account_identifier>
  <security_identifier>PETS</security_identifier>
  <borrow_quantity>100</borrow_quantity>
</borrow_transaction_request>
```

The CMBSC server may send a borrow transaction data storage request 541 to the database and/or to a WORM database 514 to book the borrow transaction. In one implementation, the borrow transaction data storage request may comprise one or more PHP/SQL statements. See FIG. 7 for additional details regarding information that may be stored off chain. The database and/or the WORM database may confirm that the borrow transaction was stored via a borrow transaction data storage response 545.

The CMBSC server may send a borrow transaction init notification 549 to the client. The borrow transaction init notification may be used to inform the user that the borrow transaction was initiated (e.g., booked). For example, the borrow transaction init notification may be displayed using a CMBSC website, application (e.g., a mobile app), sent via SMS, sent via email, and/or the like.

A blockchain sync adapter (BSA) component 553 may provide details regarding the borrow transaction (e.g., based on data stored in the database and/or the WORM database) to a blockchain node 518 (e.g., of the Ethereum Blockchain network), based on a notification from a transaction process optimizer (TPO) component, to facilitate synchronizing details regarding the borrow transaction to a blockchain. See FIG. 6A for additional details regarding the BSA component. See FIG. 6B for additional details regarding the TPO component.

The CMBSC server may send a borrow transaction sync request 557 to the blockchain node. In one implementation, the borrow transaction sync request may comprise an Ethereum smart contract that stores details regarding the borrow transaction. See FIG. 7 for additional details regarding information that may be stored on chain. The blockchain node may confirm that the borrow transaction sync request was processed via a borrow transaction sync response 561.

The CMBSC server may send a borrow transaction sync notification 565 to the client. The borrow transaction sync notification may be used to inform the user that the borrow transaction was synced to the blockchain. For example, the borrow transaction sync notification may be displayed using a CMBSC website, application (e.g., a mobile app), sent via SMS, sent via email, and/or the like.

FIG. 6A shows a logic flow illustrating embodiments of a blockchain sync adapter (BSA) component for the CMBSC. In FIG. 6A, a borrow transaction request may be obtained at 601. For example, the borrow transaction request may be obtained as a result of a user (e.g., broker-dealer) utilizing a UI to initiate a borrow transaction (e.g., to borrow shares of fully paid securities from a customer who enrolled in the broker-dealer's fully paid lending program).

Transaction data associated with the borrow transaction may be stored in databases(s) at 605. In one implementation, transaction data may be stored in a RDBMS (e.g., an Oracle database). In another implementation, transaction data may be stored in a WORM database. For example, the transaction data may be stored via a MySQL database command similar to the following:

```
INSERT INTO Transactions (transactionID, transactionType, accountID,
assetID, transactionQuantity)
VALUES (ID_Transaction_1,
BORROW_FULLY_PAID_SECURITIES, ID_account_1,
"PETS", 100);
```

A TPO component may be notified regarding the borrow transaction at 609. For example, the TPO component may keep a running count of time, risk, cost, and/or the like based on transaction details of incoming borrow transactions, and, based on the TPO component configuration settings, may signal the BSA component when to synchronize (sync) transactions to a blockchain. In one implementation, the BSA component may send a borrow transaction notification regarding the borrow transaction to the TPO component when the borrow transaction request is received. In another implementation, storing the transaction data in the database (s) may activate a database trigger that notifies the TPO component regarding the borrow transaction.

A determination may be made at 613 whether to sync the borrow transaction to the blockchain. In one implementation, this determination may be made based on whether a blockchain sync notification associated with the borrow transaction has been received from the TPO component. If a blockchain sync notification associated with the borrow transaction has not been received, the BSA component may wait for a blockchain sync notification at 617.

If a blockchain sync notification associated with the borrow transaction has been received, a sync filter may be applied to transaction attributes at 621 to determine the filtered transaction attributes (e.g., transactional attributes). In one implementation, the sync filter may be configured to filter out non-transactional attributes associated with the borrow transaction. For example, a filter mask may be applied to filter out off chain attributes shown in FIG. 7.

A summary attribute for the filtered-out attributes may be generated at 625. In one implementation, the summary attribute may be generated using a hash of the filtered-out attributes. For example, a hash of off chain attributes may be computed using a SHA-256 hashing function.

A smart contract for the borrow transaction may be generated at 629. For example, an Ethereum smart contract written using Solidity programming language may be generated. See Appendix 1 for an example of an Ethereum smart contract written using Solidity programming language that may be utilized. In one implementation, the smart contract may be configured to store on chain transaction data (e.g., transactional attributes and the summary attribute for the filtered-out non-transactional attributes) associated with the borrow transaction. In another implementation, the smart contract may be configured to provide borrow functionality (e.g., by transferring securities (assets) associated with the borrow transaction on the blockchain between the broker-dealer and the customer). In another implementation, the smart contract may be configured to provide collateral functionality (e.g., to settle the value of collateral by transferring funds between the broker-dealer's account and the customer's account with a collateral agent) associated with the borrow transaction (e.g., daily based on end of day market values of securities associated with the borrow transaction). The smart contract may be sent to a blockchain node (e.g., a node of the Ethereum Blockchain network) at 633.

A determination may be made at 637 whether a smart contract notification associated with the smart contract has been received. In one implementation, this determination may be made based on whether a borrow transaction sync response confirming that the smart contract was processed has been received from the blockchain node. In another implementation, this determination may be made based on whether a notification (e.g., confirming that the smart contract was processed, confirming that assets were transferred, confirming that collateral was transferred, confirming that an action was taken, etc.) has been received from the smart contract.

In some embodiments, the smart contract may take actions (e.g., transfer assets, transfer collateral) based on data provided by one or more oracles. In one implementation, contract terms may include a specification of the value of an asset based on data provided by an oracle. In another implementation, contract terms may include a specification of an (e.g., additional) action to take (e.g., restrict access, release an extra key, purchase stock, vote in a certain way) based on geofencing, time range fencing, anti-ping (e.g., lack of activity), transaction/consumption tracking (e.g., how crypto tokens are spent), weather, and/or the like (e.g., natural events such as flood, earthquake, volcanic eruption, lava flow; political events such as political unrest, war, terrorist attacks) conditions based on data provided by an oracle. In another implementation, contract terms may include another smart contract (e.g., that acts as an oracle) resulting in a cascading smart contract. For example, a crowdsourced decentralized weather provider oracle may obtain (e.g., from smartphones of participating users) crowdsourced weather data (e.g., temperature, humidity), and provide such (e.g., combined) weather data for the smart contract. The smart contract may specify that an order to borrow an asset (e.g., corn futures) should be placed if the crowdsourced weather data matches specifications. In another example, a crowdsourced decentralized usage tracking provider oracle may obtain (e.g., from smartphones of participating users) crowdsourced usage data (e.g., which social media services people utilize), and provide such (e.g., combined) usage data for a vote (e.g., to determine the vote outcome of a conditional vote (e.g., obtained oracle data may specify that the stock price of a popular social media services company is $8 per share, resulting in the vote outcome of 50% fractional vote for Candidate A and 50% fractional vote for Candidate B) and/or to facilitate a vote action associated with the vote outcome (e.g., to borrow 100 shares of the company's stock)). In another example, a crowdsourced decentralized usage tracking provider oracle may obtain (e.g., from smartphones of participating users) crowdsourced usage data (e.g., which soft drinks college students consume), and provide such (e.g., combined) usage data for a vote (e.g., if oracle data indicates that college students increased their consumption of Coke, the vote action may be to borrow shares of The Coca-Cola Company). In another example, borrowing and/or returning assets (e.g., stocks) may be facilitated by following stock purchases and/or sales (e.g., as specified in oracle data) of another entity (e.g., a mutual fund).

It is to be understood that a wide variety of oracles may be utilized (e.g., stock exchanges, GPS data providers, date/time providers, crowdsourced decentralized data providers, news providers, activity monitors, RSS feeds, other oracles, etc.). In various embodiments, RSS feeds may be from sensor based devices such as a mobile phone (e.g., with data from many such devices aggregated into a feed), may be social network (e.g., Twitter, Facebook) or news feeds (e.g., which may be further filtered down by various parameters), may be market data feeds (e.g., Bloomberg's PhatPipe, Consolidated Quote System (CQS), Consolidated Tape Association (CTA), Consolidated Tape System (CTS), Dun & Bradstreet, OTC Montage Data Feed (OMDF), Reuter's Tib, Triarch, US equity trade and quote market data, Unlisted Trading Privileges (UTP) Trade Data Feed (UTDF), UTP Quotation Data Feed (UQDF), and/or the like feeds, e.g., via ITC 2.1 and/or respective feed protocols), and/or the like, and selecting an oracle may make a request to obtain the selected feed's data stream.

See Appendix 2 for an example of how events from a smart contract on the blockchain may be handled. If a smart contract notification associated with the smart contract has not been received, the BSA component may wait for a smart contract notification at 641.

If a smart contract notification associated with the smart contract has been received, a borrow transaction sync notification may be provided to the user at 645. For example, the borrow transaction sync notification may be used to inform the user that the borrow transaction was synced to the blockchain. In one implementation, the borrow transaction sync notification may be a JavaScript push notification.

FIG. 6B shows a logic flow illustrating embodiments of a transaction process optimizer (TPO) component for the CMBSC. In FIG. 6B, a borrow transaction notification for a borrow transaction may be obtained at 602. In one implementation, the borrow transaction notification may be obtained from a BSA component (e.g., when the BSA component processes the borrow transaction). In another example, the borrow transaction notification may be obtained from a database (e.g., via a database trigger when details regarding the borrow transaction are stored in the database).

TPO configuration parameters may be determined at 606. For example, TPO configuration parameters may specify utilized cumulative tracking attributes, implementation type (e.g., rule-based, machine learning), utilized rules, utilized machine learning (ML) structure, synchronization (sync) threshold, and/or the like. In one implementation, a configuration file may be parsed (e.g., using PHP commands) to determine TPO configuration parameters. In another implementation, a database may be queried (e.g., using SQL statements) to determine TPO configuration parameters.

Utilized cumulative tracking attributes may be updated to reflect the impact of the borrow transaction at 610. For example, cumulative tracking attributes may include time, risk, cost, and/or the like. In one implementation, the TPO component may keep a running count of the utilized cumulative tracking attributes based on transaction details of incoming borrow transactions. For example, the TPO component may update the cost (e.g., based on last closing price) of securities associated with borrow transactions that have not yet been synchronized to a blockchain. Accordingly, the cost of securities associated with the borrow transaction may be added to the running count of the cost. In another example, the TPO component may add the borrow transaction to the set of borrow transactions that have not yet been synchronized to the blockchain since the last time that a sync to the blockchain occurred.

A determination may be made at 614 regarding the implementation type. If the implementation is rule-based, utilized rules may be determined at 620. In one embodiment, a set of rules may be utilized to determine when borrow transactions should be synchronized to the blockchain based on a sync threshold. For example, the rules may specify that a sync should occur if the cumulative cost of securities associated with non-synchronized borrow transactions exceeds $10 million or if 12 hours passed since the last sync. In one implementation, time-based rules may be utilized. For example, time-based rules may specify that a sync should occur periodically (e.g., every twenty-four hours, every five minutes), at set times, and/or the like. In another implementation, cost-based rules may be utilized. For example, cost-based rules may specify that a sync should occur if the cumulative cost of securities associated with non-synchronized borrow transactions exceeds a threshold (e.g., $15 million). In another implementation, risk-based rules may be utilized. For example, risk-based rules may specify that a sync should occur if the cumulative risk (e.g., calculated based on a standard deviation of returns) of securities associated with non-synchronized borrow transactions exceeds a threshold. In another example, risk-based rules may specify that a sync should occur if the risk associated with calculating variable values (e.g., when variable values are rapidly changing, such as when rules are based on real-time asset prices) is acceptable (e.g., have high confidence that the most volatile values have been calculated). Accordingly, such a rule (e.g., utilized to prevent writing out failed contracts to the blockchain, which would be inefficient) may specify that when a set of variables (e.g., 7 out of 10) specified by the rule (e.g., based on a statistical analysis, based on analysis by a ML component) have been solved for, a sync should occur. Further, such a rule may specify that when a smart contract utilized for the sync is generated, the smart contract should include a hash of the set of variables (e.g., 7 variables) that have been solved for and a wrapper with the set of variables (e.g., 3 variables) that still remain to be solved for. Because the riskiest values have been calculated, the risk (e.g., the risk associated with calculating the remaining variables off chain, the risk associated with writing the remaining variables to the blockchain at a later time) is assuaged. The utilized rules may be applied to the utilized cumulative tracking attributes at 624. In one embodiment, the utilized set of rules may be applied to determine whether a sync threshold associated with the utilized set of rules has been triggered (e.g., exceeded). In one implementation, a blockchain sync should occur if the sync threshold is triggered.

If the implementation is ML-based, a utilized ML structure may be determined at 630. In one embodiment, a ML structure may be utilized to determine when borrow transactions should be synchronized to the blockchain based on historical data analysis. In one implementation, the ML structure (e.g., a neural network) may use cumulative tracking attributes as inputs and output a value to indicate whether a sync should occur. For example, the ML structure may be generated using the Scikit-learn machine learning library for the Python programming language. Various methods, such as Classification, Support Vector Machine, etc., can be used to analyze historical transactions data sets (e.g., fields such as time-stamp of a transaction, amount associated with a transaction, customer identifier associated with a transaction) to identify the pattern to optimize transactions push timing (sync timing) to the blockchain. The cumulative tracking attributes may be analyzed using the utilized ML structure at 634. In one embodiment, the utilized ML structure may be used to determine whether a sync threshold has been triggered (e.g., if the output value exceeds a specified threshold). In one implementation, a blockchain sync should occur if the sync threshold is triggered.

A determination may be made at 640 whether the sync threshold has been triggered. If the sync threshold has been triggered, the TPO component may send a blockchain sync notification to the BSA component. In one implementation, the blockchain sync notification may specify a set of borrow transactions that should be synchronized to the blockchain. In another implementation, the blockchain sync notification may specify how smart contracts utilized for the sync should be configured.

FIG. 7 shows a screenshot for the CMBSC. In FIG. 7, the "Fields" column shows attribute names and the "Example" column shows the corresponding attribute values that may be utilized for processing a borrow transaction. The "Off Chain" column shows attributes that may be stored off chain. The "On Chain" column shows attributes that may be stored on chain. The "On Chain" column shows that in addition to regular attributes, a hash of off chain attributes computed using a SHA-256 hashing function may be stored on chain.

FIGS. 8-20 show various states of exemplary user interface screens that may be provided to different users throughout a borrow transaction. For example, the borrow transaction may involve a broker-dealer (e.g., Fidelity) borrowing 250 shares of PETS (Cusip—716382106) @2500 bps from a customer (e.g., Client C). Details before the borrow transaction is initiated may be as follows:

| | |
|---|---|
| Client | Client C |
| Company | PetMed Express, Inc. |
| Cusip | 716382106 |
| Ticker | PETS |
| # Shares Available to Lend | 800 |

-continued

| | |
|---|---|
| # Shares to be Borrowed | 250 |
| Client's Current Collateral with Agent | $ 390,247 |
| Fidelity's Current Collateral with Agent | $24,885,245 |
| Anticipated Delta | $— |
| Anticipated Collateral | $24,885,245 |

FIG. 8 shows a screenshot illustrating user interface(s) of the CMBSC. In FIG. 8, a collateral agent's view before the borrow transaction is initiated is illustrated. Details provided to the collateral agent (e.g., Wells Fargo) may be as follows:

| | |
|---|---|
| Client's Current Collateral with Agent | $ 390,247 |
| Fidelity's Current Collateral with Agent | $24,885,245 |
| Anticipated Delta | $— |
| Anticipated Collateral | $24,885,245 |

FIG. 9 shows a screenshot illustrating user interface(s) of the CMBSC. In FIG. 9, a broker-dealer's view before the borrow transaction is initiated is illustrated. Details provided to the broker-dealer may be as follows:

| | |
|---|---|
| Client | Client C |
| Company | PetMed Express, Inc. |
| Cusip | 716382106 |
| Ticker | PETS |
| # Shares Available to Lend | 800 |
| # Shares to be Borrowed | 250 |
| On Loan | 2200 |
| Fidelity's Current Collateral with Agent | $24,885,245 |
| Fidelity's Current Collateral for Client C | $ 390,247 |

FIG. 10 shows a screenshot illustrating user interface(s) of the CMBSC. In FIG. 10, a customer's view before the borrow transaction is initiated is illustrated. Details provided to the customer (client) may be as follows:

| | |
|---|---|
| Company | PetMed Express, Inc. |
| Cusip | 716382106 |
| Ticker | PETS |
| # Shares Available to Lend | 800 |
| On Loan | 2200 |
| Client's Current Collateral with Agent | $ 390,247 |

FIG. 11 shows a screenshot illustrating user interface(s) of the CMBSC. When a trader of the broker-dealer wishes to initiate a borrow transaction, the trader may input the number of shares the trader wishes to borrow 1101 and/or a rate at which the trader wishes to borrow the shares 1105, and may utilize the "Book" button 1110 to initiate the borrow transaction.

FIG. 12 shows a screenshot illustrating user interface(s) of the CMBSC. Once the borrow transaction is initiated, the trader may be informed via an alert 1201 that the borrow transaction will be synced to a blockchain.

FIG. 13 shows a screenshot illustrating user interface(s) of the CMBSC. Once the borrow transaction is synced to the blockchain, the trader may be informed via an alert 1301 that the broker-dealer has borrowed from the customer.

FIG. 14 shows a screenshot illustrating user interface(s) of the CMBSC. Once the borrow transaction is synced to the blockchain, the customer may be informed via an alert 1401 that the broker-dealer has borrowed from the customer and/or via an alert 1405 that collateral associated with the customer's account with a collateral agent has been updated.

FIG. 15 shows a screenshot illustrating user interface(s) of the CMBSC. Once the borrow transaction takes place, UI components (e.g., fields) such as transaction list, security availability, on loan, avail to land, and/or the like may be updated in the customer's view.

FIG. 16 shows a screenshot illustrating user interface(s) of the CMBSC. Once the borrow transaction takes place, UI components (e.g., fields) such as transaction list, borrowed securities, on loan, avail to land, and/or the like may be updated in the broker-dealer's view.

FIG. 17 shows a screenshot illustrating user interface(s) of the CMBSC. Once the broker-dealer releases the collateral schedule, the trader may be informed via an alert 1701.

FIG. 18 shows a screenshot illustrating user interface(s) of the CMBSC. Once the release of the collateral schedule is synced to the blockchain, a blockchain update happens as the anticipated amount of transfer from the broker-dealer's account to the customer's account with a collateral agent gets updated, and the trader may be informed via an alert 1801. Wire Requirement widget 1805 may be updated once the collateral is released by the broker-dealer. Anticipated Delta field may show the amount the collateral agent will get by the end of the day in the customer's account from the broker-dealer. If the amount is negative, that means the amount will be withdrawn.

FIG. 19 shows a screenshot illustrating user interface(s) of the CMBSC. Once the release of the collateral schedule is synced to the blockchain, a blockchain update happens as the anticipated amount of transfer from the broker-dealer's account to the customer's account with a collateral agent gets updated, and the customer may be informed via an alert 1901. Wire Requirement widget 1905 may be updated once the collateral is released by the broker-dealer. Anticipated Delta field may show the amount the collateral agent will get by the end of the day in the customer's account from the broker-dealer. If the amount is negative, that means the amount will be withdrawn.

FIG. 20 shows a screenshot illustrating user interface(s) of the CMBSC. Wire Requirement widget 2005 may be updated once the collateral is released by the broker-dealer. Anticipated Delta field may show the amount the collateral agent will get by the end of the day in the customer's account from the broker-dealer. If the amount is negative, that means the amount will be withdrawn.

Additional Alternative Embodiment Examples

The following alternative example embodiments provide a number of variations of some of the core principles already discussed for expanded color on the abilities of the CMBSC.

Exemplary Borrow Process—Alternative Embodiment 1

The trader will use "Security Search" function in the Borrow Securities widget to see how many clients hold the concerned security, in this case PETS.

The trader will be able to see:

0121.1. Clients holding security 0121.2. Prior Borrow of that security—On Loan quantity 0121.3. Current quantity of the security—Available to Lend Quantity The trader will be able to input number of shares (he wants to borrow) and rate at which the trader wants to borrow shares.

Once the trader inputs the details, "Book" button will be available so that by pressing the button, borrow can be initiated.

As soon as the process is started, the trader will be informed via an alert which states "Booking on Blockchain". The screen will also inform that Fidelity has borrowed from Client C.

Client will also be informed via an alert which informs the user about Loan transaction occurring by him/meaning Borrow transaction by Fidelity.

Once Borrow is initiated, below fields will be updated in Fidelity View:

0126.1. Transaction list 0126.2. Borrowed Securities 0126.3. On Loan and Avail to Lend fields in all screens Once Borrow is initiated, below fields will be updated in Client View:

0127.1. Transaction list 0127.2. Security Availability 0127.3. On Loan and Avail to Lend fields in all screens When Fidelity releases the collateral schedule, Blockchain update happens as the anticipated amount of transfer from Fidelity's account to Client's account gets updated.

Anticipated Delta column in Wire Requirement widget in Fidelity View, Agent View and Client View screens will only be updated once Fidelity releases the schedule (collateral schedule) which means collateral will be updated.

Wire Requirement widget in all three screens namely Fidelity View, Client View and Agent View will be updated once the collateral is released by Fidelity. Anticipated Delta field will show the amount Agent will get by the end of the day in Client's account from Fidelity. If the amount is negative, that means the amount will be withdrawn.

Exemplary Borrow Process—Alternative Embodiment 2

When a broker dealer borrows a security from its client, the transaction will be reported on Oracle database first. From Oracle database, the transaction details will flow into the WORM (Write Once Read Many) database. Once the transaction is stored on Oracle database, transaction data will flow on to the Blockchain, and then based on Transaction Process Optimizer rules. TPO (Transaction Process Optimizer) would be operated based on various risk parameters which include number of transactions, data storage or schedule.

However, non-transactional data will be replicated on the distributed servers and would not flow on to the blockchain. This unique approach will increase the speed of overall data transfer and save the data storage on the Blockchain (by excluding static data from the Blockchain).

CMBSC Controller

FIG. 21 shows a block diagram illustrating embodiments of a CMBSC controller. In this embodiment, the CMBSC controller 2101 may serve to aggregate, process, store, search, serve, identify, instruct, generate, match, and/or facilitate interactions with a computer through information technology technologies, and/or other related data.

Users, which may be people and/or other systems, may engage information technology systems (e.g., computers) to facilitate information processing. In turn, computers employ processors to process information; such processors 2103 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 2129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the CMBSC controller 2101 may be connected to and/or communicate with entities such as, but not limited to: one or more users from peripheral devices 2112 (e.g., user input devices 2111); an optional cryptographic processor device 2128; and/or a communications network 2113.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WAN s), Wireless Networks (WLANs), etc. For example, the Internet is, generally, an interconnection of a multitude of networks whereby remote clients and servers may access and interoperate with one another.

The CMBSC controller 2101 may be based on computer systems that may comprise, but are not limited to, components such as: a computer systemization 2102 connected to memory 2129.

Computer Systemization

A computer systemization 2102 may comprise a clock 2130, central processing unit ("CPU(s)" and/or "processor (s)" (these terms are used interchangeable throughout the disclosure unless noted to the contrary)) 2103, a memory 2129 (e.g., a read only memory (ROM) 2106, a random access memory (RAM) 2105, etc.), and/or an interface bus 2107, and most frequently, although not necessarily, are all interconnected and/or communicating through a system bus 2104 on one or more (mother)board(s) 2102 having conductive and/or otherwise transportive circuit pathways through which instructions (e.g., binary encoded signals) may travel to effectuate communications, operations, storage, etc. The computer systemization may be connected to a power source 2186; e.g., optionally the power source may be internal. Optionally, a cryptographic processor 2126 may be connected to the system bus. In another embodiment, the cryptographic processor, transceivers (e.g., ICs) 2174, and/or sensor array (e.g., accelerometer, altimeter, ambient light, barometer, global positioning system (GPS) (thereby allowing CMBSC controller to determine its location), gyroscope, magnetometer, pedometer, proximity, ultra-violet sensor, etc.) 2173 may be connected as either internal and/or external peripheral devices 2112 via the interface bus I/O 2108 (not pictured) and/or directly via the interface bus 2107. In turn, the transceivers may be connected to antenna(s) 2175, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11 g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2129 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the CMBSC controller and beyond through various interfaces. Should processing requirements dictate a greater amount speed and/or capacity, distributed processors (e.g., see Distributed CMBSC below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the CMBSC may be achieved by implementing a microcontroller such as CAST's® R8051XC2 microcontroller; Intel's® MCS 51 (i.e., 8051 microcontroller); and/or the like. Also, to implement certain features of the CMBSC, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the CMBSC component collection (distributed or otherwise) and/or features may be implemented via the microprocessor and/or via embedded components; e.g., via ASIC, coprocessor, DSP, FPGA, and/or the like. Alternately, some implementations of the CMBSC may be implemented with embedded components that are configured and used to achieve a variety of features or signal processing.

Depending on the particular implementation, the embedded components may include software solutions, hardware solutions, and/or some combination of both hardware/software solutions. For example, CMBSC features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the CMBSC features. A hierarchy of programmable interconnects allow logic blocks to be interconnected as needed by the CMBSC system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the CMBSC may be developed on FPGAs and then migrated into a fixed version that more resembles ASIC implementations. Alternate or coordinating implementations may migrate CMBSC controller features to a final ASIC instead of or in addition to FPGAs. Depending on the implementation all of the aforementioned embedded components and microprocessors may be considered the "CPU" and/or "processor" for the CMBSC.

Power Source

The power source 2186 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2186 is connected to at least one of the interconnected subsequent components of the CMBSC thereby providing an electric current to all subsequent components. In one example, the power source 2186 is connected to the system bus component 2104. In an alternative embodiment, an outside power source 2186 is provided through a connection across the I/O 2108 interface. For example, a USB and/or IEEE 1394 connection carries both data and power across the connection and is therefore a suitable source of power.

Interface Adapters

Interface bus(ses) 2107 may accept, connect, and/or communicate to a number of interface adapters, variously although not necessarily in the form of adapter cards, such as but not limited to: input output interfaces (I/O) 2108, storage interfaces 2109, network interfaces 2110, and/or the like. Optionally, cryptographic processor interfaces 2127 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2109 may accept, communicate, and/or connect to a number of storage devices such as, but not limited to: storage devices 2114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2110 may accept, communicate, and/or connect to a communications network 2113. Through a communications network 2113, the CMBSC controller is accessible through remote clients 2133*b* (e.g., computers with web browsers) by users 2133*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed CMBSC below), architectures may similarly be employed to pool, load balance, and/or otherwise decrease/increase the communicative bandwidth required by the CMBSC controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 2110 may be used to engage with various communications network types 2113. For example, multiple network interfaces may be employed to allow for the communication over broadcast, multicast, and/or unicast networks.

Input Output interfaces (I/O) 2108 may accept, communicate, and/or connect to user, peripheral devices 2112 (e.g., input devices 2111), cryptographic processor devices 2128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 2112 may be connected and/or communicate to I/O and/or other facilities of the like such as network interfaces, storage interfaces, directly to the interface bus, system bus, the CPU, and/or the like. Peripheral devices may be external, internal and/or part of the CMBSC controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 2111 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the CMBSC controller may be embodied as an embedded, dedicated, and/or monitor-less (i.e., headless) device, wherein access would be provided over a network interface connection.

Cryptographic units such as, but not limited to, microcontrollers, processors 2126, interfaces 2127, and/or devices 2128 may be attached, and/or communicate with the CMBSC controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 2129. However, memory is a fungible technology and resource, thus, any number of memory embodiments may be employed in lieu of or in concert with one another. It is to be understood that the CMBSC controller and/or a computer systemization may employ various forms of memory 2129. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 2129 will include ROM 2106, RAM 2105, and a storage device 2114. A storage device 2114 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 2129 may contain a collection of program and/or database components and/or data such as, but not limited to: operating system component(s) 2115 (operating system); information server component(s) 2116 (information server); user interface component(s) 2117 (user interface); Web browser component(s) 2118 (Web browser); database(s) 2119; mail server component(s) 2121; mail client component(s) 2122; cryptographic server component(s) 2120 (cryptographic server); the CMBSC component(s) 2135; and/or the like (i.e., collectively a component collection). These components may be stored and accessed from the storage devices and/or from storage devices accessible through an interface bus. Although unconventional program components such as those in the component collection may be stored in a local storage device 2114, they may also be loaded and/or stored in memory such as: peripheral devices, RAM, remote storage facilities through a communications network, ROM, various forms of memory, and/or the like.

Operating System

The operating system component 2115 is an executable program component facilitating the operation of the CMBSC controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the CMBSC controller to communicate with other entities through a communications network 2113. Various communication protocols may be used by the CMBSC controller as a subcarrier transport mechanism for interaction, such as, but not limited to: multicast, TCP/IP, UDP, unicast, and/or the like.

Information Server

An information server component 2116 is a stored program component that is executed by a CPU. The information server may be a an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the CMBSC controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the CMBSC database 2119, operating systems, other program components, user interfaces, Web browsers, and/or the like.

Access to the CMBSC database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the CMBSC. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the CMBSC as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 2117 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2118 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the CMBSC enabled nodes. The combined application may be nugatory on systems employing Web browsers.

Mail Server

A mail server component 2121 is a stored program component that is executed by a CPU 2103. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the CMBSC. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the CMBSC mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2122 is a stored program component that is executed by a CPU 2103. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2120 is a stored program component that is executed by a CPU 2103, cryptographic processor 2126, cryptographic processor interface 2127, cryptographic processor device 2128, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the CMBSC may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to allow the CMBSC component to engage in secure transactions if so desired. The cryptographic component facilitates the secure accessing of resources on the CMBSC and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The CMBSC Database

The CMBSC database component 2119 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the CMBSC database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the CMBSC database is implemented as a data-structure, the use of the CMBSC database 2119 may be integrated into another component such as the CMBSC component 2135. Also, the database may be implemented as a mix of data structures, objects, and relational structures. Databases may be consolidated and/or distributed in countless variations (e.g., see Distributed CMBSC below). Portions of databases, e.g., tables, may be exported and/or imported and thus decentralized and/or integrated.

In one embodiment, the database component 2119 includes several tables 2119*a-z:*

An accounts table 2119*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 2119*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a CMBSC);

An devices table 2119*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceVersion, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table **2119*d*** includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table **2119*e*** includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table **2119*f*** includes fields such as, but not limited to: paymentID, accountID, userID, couponID, couponValue, couponConditions, couponExpiration, paymentType, paymen tAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymen tAccessPrivileges, paymentPreferences, payementRestrictions, and/or the like;

An transactions table **2119*g*** includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table **2119*h*** includes fields such as, but not limited to: merchantID, merchantTaxID, merchanteName, merchantContactUserID, accountID, is suerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table **2119*i*** includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publis herAddress, publis herURL, publisherTag, publisherindustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A TPO table **2119*j*** includes fields such as, but not limited to: optimizerConfigurationID, configurationParameters, trackingAttributes, rules, machineLearningStructures, and/or the like;

A market_data table **2119*z*** includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe®, Consolidated Quote System® (CQS), Consolidated Tape Association® (CTA), Consolidated Tape System® (CTS), Dun & Bradstreet®, OTC Montage Data Feed® (OMDF), Reuter's Tib®, Triarch®, US equity trade and quote market Data®, Unlisted Trading Privileges® (UTP) Trade Data Feed® (UTDF), UTP Quotation Data Feed® (UQDF), and/or the like feeds, e.g., via ITC 2.1 and/or respective feed protocols), for example, through Microsoft's® Active Template Library and Dealing Object Technology's real-time toolkit Rtt.Multi.

In one embodiment, the CMBSC database may interact with other database systems. For example, employing a distributed database system, queries and data access by search CMBSC component may treat the combination of the CMBSC database, an integrated data security layer database as a single database entity (e.g., see Distributed CMBSC below).

In one embodiment, user programs may contain various user interface primitives, which may serve to update the CMBSC. Also, various accounts may require custom database tables depending upon the environments and the types of clients the CMBSC may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components **2119*a-z***. The CMBSC may be configured to keep track of various settings, inputs, and parameters via database controllers.

The CMBSC database may communicate to and/or with other components in a component collection, including itself, and/or facilities of the like. Most frequently, the CMBSC database communicates with the CMBSC component, other program components, and/or the like. The database may contain, retain, and provide information regarding other nodes and data.

The CMBSCs

The CMBSC component 2135 is a stored program component that is executed by a CPU. In one embodiment, the CMBSC component incorporates any and/or all combinations of the aspects of the CMBSC that was discussed in the previous figures. As such, the CMBSC affects accessing, obtaining and the provision of information, services, transactions, and/or the like across various communications networks. The features and embodiments of the CMBSC discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the CMBSC's features and facilities, and in many cases reduce the costs, energy consumption/requirements, and extend the life of CMBSC's underlying infrastructure; this has the added benefit of making the CMBSC more reliable. Similarly, many of the features and mechanisms are designed to be easier for users to use and access, thereby broadening the audience that may enjoy/employ and exploit the feature sets of the CMBSC; such ease of use also helps to increase the reliability of the CMBSC. In addition, the feature sets include heightened security as noted via the Cryptographic components 2120, 2126, 2128 and throughout, making access to the features and data more reliable and secure The CMBSC transforms borrow transaction request inputs, via CMBSC components (e.g., BSA, TPO), into borrow transaction init notification, borrow transaction sync notification outputs.

The CMBSC component enabling access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the CMBSC server employs a cryptographic server to encrypt and decrypt communications. The CMBSC component may communicate to and/or with other components in a component collection, including itself, and/or facilities of the like. Most frequently, the CMBSC component communicates with the CMBSC database, operating systems, other program components, and/or the like. The CMBSC may contain, communicate, generate, obtain, and/or provide program component, system, user, and/or data communications, requests, and/or responses.

Distributed CMBSCs

The structure and/or operation of any of the CMBSC node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the CMBSC controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for CMBSC controller and/or CMBSC component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

```
w3c -post http://... Value1
```

where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the CMBSC controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
  $input = "";
  $input = socket_read($client, 1024);
  $data .= $input;
} while($input != "");
```

-continued

```
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

```
http://www.xav.com/perl/site/lib/SOAP/Parser.html
http://publib.boulder.ibm.com/infocenter/tivihelp/v2r1/
index.jsp?topic=/com.ibm.IBMDI.doc/referenceguide295.htm
```

and other parser implementations:

```
http://publib.boulder.ibm.com/infocenter/tivihelp/v2r1/
index.jsp?topic=/com.ibm.IBMDI.doc/referenceguide259.htm
```

all of which are hereby expressly incorporated by reference.

Additional embodiments may include:

1. A blockchain synchronizing apparatus, comprising:
a memory;
a component collection in the memory, including:
a blockchain sync adaptor component, and
a transaction process optimizer component;
a processor disposed in communication with the memory, and configured to issue a plurality of processing instructions from the component collection stored in the memory,
wherein the processor issues instructions from the blockchain sync adaptor component, stored in the memory, to:
obtain, via at least one processor, a borrow transaction request associated with a borrow transaction;
store, via at least one processor, transaction attributes associated with the borrow transaction in a database;
notify, via at least one processor, the transaction process optimizer component regarding the borrow transaction;
obtain, via at least one processor, a blockchain sync notification associated with the borrow transaction from the transaction process optimizer component;
filter, via at least one processor, the stored transaction attributes associated with the borrow transaction;
generate, via at least one processor, a smart contract associated with the borrow transaction, wherein the smart contract includes the filtered transaction attributes;
send, via at least one processor, the generated smart contract to a blockchain node of a blockchain network;
receive, via at least one processor, a smart contract notification associated with the smart contract; and provide, via at least one processor, a push notification to a user interface component of a user's client regarding the smart contract notification.

2. The apparatus of embodiment 1, wherein the transaction attributes include a customer's customer identifier with a broker-dealer, an identifier of a fully paid security in the customer's account with the broker-dealer to be borrowed, and an identifier of a collateral agent that will hold collateral for the fully paid security to be borrowed.

3. The apparatus of embodiment 1, wherein the database is a write once read many (WORM) database.

4. The apparatus of embodiment 1, wherein the transaction process optimizer component is notified via a borrow transaction notification based on receipt of the borrow transaction request.

5. The apparatus of embodiment 1, wherein the transaction process optimizer component is notified via a borrow transaction notification from the database based on activation of a database trigger associated with storing the transaction attributes in the database.

6. The apparatus of embodiment 1, further, comprising:
the processor issues instructions from the transaction process optimizer component, stored in the memory, to:
obtain, via at least one processor, a borrow transaction notification associated with the borrow transaction;
update, via at least one processor, a set of utilized cumulative tracking attributes to reflect details of the borrow transaction;
determine, via at least one processor, that a sync threshold has been triggered based on analysis of the set of utilized cumulative tracking attributes; and
send, via at least one processor, the blockchain sync notification to the blockchain sync adaptor component.

7. The apparatus of embodiment 6, wherein the analysis of the set of utilized cumulative tracking attributes further comprises instructions to:
determine a set of utilized rules; and
apply the set of utilized rules to the set of utilized cumulative tracking attributes to determine whether the sync threshold has been triggered.

8. The apparatus of embodiment 6, wherein the analysis of the set of utilized cumulative tracking attributes further comprises instructions to:
determine a utilized machine learning structure; and
provide the set of utilized cumulative tracking attributes as inputs to the utilized machine learning structure to determine whether the sync threshold has been triggered.

9. The apparatus of embodiment 8, wherein the utilized machine learning structure is a neural network.

10. The apparatus of embodiment 6, wherein the blockchain sync notification specifies a set of borrow transactions, including the borrow transaction, that should be synchronized to the blockchain network.

11. The apparatus of embodiment 1, wherein the filtered transaction attributes are transactional attributes associated with the borrow transaction.

12. The apparatus of embodiment 1, further, comprising:
the processor issues instructions from the blockchain sync adaptor component, stored in the memory, to:
generate a summary attribute using a hash of the filtered-out attributes; and
wherein the smart contract includes the summary attribute.

13. The apparatus of embodiment 1, wherein the smart contract is an Ethereum smart contract that utilizes an oracle.

14. The apparatus of embodiment 6,
wherein the smart contract includes a set of precalculated variables with values calculated before the smart contract is sent to the blockchain node;
wherein the smart contract includes a set of postcalculated variables with values to be calculated off-chain after the smart contract is sent to the blockchain node; and
wherein the smart contract is configured to obtain the set of postcalculated variables from an oracle; and
wherein the analysis of the set of utilized cumulative tracking attributes indicates an acceptable risk value associated with calculating values of the set of postcalculated variables off-chain.

15. The apparatus of embodiment 2,
wherein the smart contract is implemented to perform periodic settlement of collateral associated with the borrow transaction by transferring funds between the broker-dealer's account and the customer's account with the collateral agent;
wherein frequency of the periodic settlement is configured via an oracle;
wherein the smart contract notification is generated when a periodic settlement occurs; and
wherein the user interface component notifies the user regarding the periodic settlement.

16. A processor-readable blockchain synchronizing non-transient physical medium storing processor-executable components, the components, comprising:
a component collection stored in the medium, including:
a blockchain sync adaptor component, and
a transaction process optimizer component;
wherein the blockchain sync adaptor component, stored in the medium, includes processor-issuable instructions to:
obtain, via at least one processor, a borrow transaction request associated with a borrow transaction;
store, via at least one processor, transaction attributes associated with the borrow transaction in a database;
notify, via at least one processor, the transaction process optimizer component regarding the borrow transaction;
obtain, via at least one processor, a blockchain sync notification associated with the borrow transaction from the transaction process optimizer component;
filter, via at least one processor, the stored transaction attributes associated with the borrow transaction;
generate, via at least one processor, a smart contract associated with the borrow transaction, wherein the smart contract includes the filtered transaction attributes;
send, via at least one processor, the generated smart contract to a blockchain node of a blockchain network;
receive, via at least one processor, a smart contract notification associated with the smart contract; and provide, via at least one processor, a push notification to a user interface component of a user's client regarding the smart contract notification.

17. The medium of embodiment 16, wherein the transaction attributes include a customer's customer identifier with a broker-dealer, an identifier of a fully paid security in the customer's account with the broker-dealer to be borrowed, and an identifier of a collateral agent that will hold collateral for the fully paid security to be borrowed.

18. The medium of embodiment 16, wherein the database is a write once read many (WORM) database.

19. The medium of embodiment 16, wherein the transaction process optimizer component is notified via a borrow transaction notification based on receipt of the borrow transaction request.

20. The medium of embodiment 16, wherein the transaction process optimizer component is notified via a borrow transaction notification from the database based on activation of a database trigger associated with storing the transaction attributes in the database.

21. The medium of embodiment 16, further, comprising:
the transaction process optimizer component, stored in the medium, includes processor-issuable instructions to:
obtain, via at least one processor, a borrow transaction notification associated with the borrow transaction;
update, via at least one processor, a set of utilized cumulative tracking attributes to reflect details of the borrow transaction;
determine, via at least one processor, that a sync threshold has been triggered based on analysis of the set of utilized cumulative tracking attributes; and
send, via at least one processor, the blockchain sync notification to the blockchain sync adaptor component.

22. The medium of embodiment 21, wherein the analysis of the set of utilized cumulative tracking attributes further comprises instructions to:
determine a set of utilized rules; and
apply the set of utilized rules to the set of utilized cumulative tracking attributes to determine whether the sync threshold has been triggered.

23. The medium of embodiment 21, wherein the analysis of the set of utilized cumulative tracking attributes further comprises instructions to:
determine a utilized machine learning structure; and
provide the set of utilized cumulative tracking attributes as inputs to the utilized machine learning structure to determine whether the sync threshold has been triggered.

24. The medium of embodiment 23, wherein the utilized machine learning structure is a neural network.

25. The medium of embodiment 21, wherein the blockchain sync notification specifies a set of borrow transactions, including the borrow transaction, that should be synchronized to the blockchain network.

26. The medium of embodiment 16, wherein the filtered transaction attributes are transactional attributes associated with the borrow transaction.

27. The medium of embodiment 16, further, comprising:
the blockchain sync adaptor component, stored in the medium, includes processor-issuable instructions to:
generate a summary attribute using a hash of the filtered-out attributes; and
wherein the smart contract includes the summary attribute.

28. The medium of embodiment 16, wherein the smart contract is an Ethereum smart contract that utilizes an oracle.

29. The medium of embodiment 21,
wherein the smart contract includes a set of precalculated variables with values calculated before the smart contract is sent to the blockchain node;
wherein the smart contract includes a set of postcalculated variables with values to be calculated off-chain after the smart contract is sent to the blockchain node;
wherein the smart contract is configured to obtain the set of postcalculated variables from an oracle; and
wherein the analysis of the set of utilized cumulative tracking attributes indicates an acceptable risk value associated with calculating values of the set of postcalculated variables off-chain.

30. The medium of embodiment 17,
wherein the smart contract is implemented to perform periodic settlement of collateral associated with the borrow transaction by transferring funds between the broker-dealer's account and the customer's account with the collateral agent;
wherein frequency of the periodic settlement is configured via an oracle;
wherein the smart contract notification is generated when a periodic settlement occurs; and
wherein the user interface component notifies the user regarding the periodic settlement.

31. A processor-implemented blockchain synchronizing system, comprising:
a blockchain sync adaptor component means, to:
obtain, via at least one processor, a borrow transaction request associated with a borrow transaction;
store, via at least one processor, transaction attributes associated with the borrow transaction in a database;
notify, via at least one processor, the transaction process optimizer component regarding the borrow transaction;
obtain, via at least one processor, a blockchain sync notification associated with the borrow transaction from the transaction process optimizer component;
filter, via at least one processor, the stored transaction attributes associated with the borrow transaction;
generate, via at least one processor, a smart contract associated with the borrow transaction, wherein the smart contract includes the filtered transaction attributes;
send, via at least one processor, the generated smart contract to a blockchain node of a blockchain network;
receive, via at least one processor, a smart contract notification associated with the smart contract; and
provide, via at least one processor, a push notification to a user interface component of a user's client regarding the smart contract notification.

32. The system of embodiment 31, wherein the transaction attributes include a customer's customer identifier with a broker-dealer, an identifier of a fully paid security in the customer's account with the broker-dealer to be borrowed, and an identifier of a collateral agent that will hold collateral for the fully paid security to be borrowed.

33. The system of embodiment 31, wherein the database is a write once read many (WORM) database.

34. The system of embodiment 31, wherein the transaction process optimizer component is notified via a borrow transaction notification based on receipt of the borrow transaction request.

35. The system of embodiment 31, wherein the transaction process optimizer component is notified via a borrow transaction notification from the database based on activation of a database trigger associated with storing the transaction attributes in the database.

36. The system of embodiment 31, further, comprising:
a transaction process optimizer component means, to:
obtain, via at least one processor, a borrow transaction notification associated with the borrow transaction;
update, via at least one processor, a set of utilized cumulative tracking attributes to reflect details of the borrow transaction;
determine, via at least one processor, that a sync threshold has been triggered based on analysis of the set of utilized cumulative tracking attributes; and
send, via at least one processor, the blockchain sync notification to the blockchain sync adaptor component.

37. The system of embodiment 36, wherein the analysis of the set of utilized cumulative tracking attributes further comprises instructions to:
determine a set of utilized rules; and
apply the set of utilized rules to the set of utilized cumulative tracking attributes to determine whether the sync threshold has been triggered.

38. The system of embodiment 36, wherein the analysis of the set of utilized cumulative tracking attributes further comprises instructions to:
determine a utilized machine learning structure; and
provide the set of utilized cumulative tracking attributes as inputs to the utilized machine learning structure to determine whether the sync threshold has been triggered.

39. The system of embodiment 38, wherein the utilized machine learning structure is a neural network.

40. The system of embodiment 36, wherein the blockchain sync notification specifies a set of borrow transactions, including the borrow transaction, that should be synchronized to the blockchain network.

41. The system of embodiment 31, wherein the filtered transaction attributes are transactional attributes associated with the borrow transaction.

42. The system of embodiment 31, further, comprising:
the blockchain sync adaptor component means, to:
generate a summary attribute using a hash of the filtered-out attributes; and
wherein the smart contract includes the summary attribute.

43. The system of embodiment 31, wherein the smart contract is an Ethereum smart contract that utilizes an oracle.

44. The system of embodiment 36,
wherein the smart contract includes a set of precalculated variables with values calculated before the smart contract is sent to the blockchain node;
wherein the smart contract includes a set of postcalculated variables with values to be calculated off-chain after the smart contract is sent to the blockchain node;
wherein the smart contract is configured to obtain the set of postcalculated variables from an oracle; and
wherein the analysis of the set of utilized cumulative tracking attributes indicates an acceptable risk value associated with calculating values of the set of postcalculated variables off-chain.

45. The system of embodiment 32,
wherein the smart contract is implemented to perform periodic settlement of collateral associated with the borrow transaction by transferring funds between the broker-dealer's account and the customer's account with the collateral agent;
wherein frequency of the periodic settlement is configured via an oracle;
wherein the smart contract notification is generated when a periodic settlement occurs; and
wherein the user interface component notifies the user regarding the periodic settlement.

46. A processor-implemented blockchain synchronizing method, comprising:
executing processor-implemented blockchain sync adaptor component instructions to:
obtain, via at least one processor, a borrow transaction request associated with a borrow transaction;
store, via at least one processor, transaction attributes associated with the borrow transaction in a database;
notify, via at least one processor, the transaction process optimizer component regarding the borrow transaction;
obtain, via at least one processor, a blockchain sync notification associated with the borrow transaction from the transaction process optimizer component;
filter, via at least one processor, the stored transaction attributes associated with the borrow transaction;
generate, via at least one processor, a smart contract associated with the borrow transaction, wherein the smart contract includes the filtered transaction attributes;
send, via at least one processor, the generated smart contract to a blockchain node of a blockchain network;
receive, via at least one processor, a smart contract notification associated with the smart contract; and
provide, via at least one processor, a push notification to a user interface component of a user's client regarding the smart contract notification.

47. The method of embodiment 46, wherein the transaction attributes include a customer's customer identifier with a broker-dealer, an identifier of a fully paid security in the customer's account with the broker-dealer to be borrowed, and an identifier of a collateral agent that will hold collateral for the fully paid security to be borrowed.

48. The method of embodiment 46, wherein the database is a write once read many (WORM) database.

49. The method of embodiment 46, wherein the transaction process optimizer component is notified via a borrow transaction notification based on receipt of the borrow transaction request.

50. The method of embodiment 46, wherein the transaction process optimizer component is notified via a borrow transaction notification from the database based on activation of a database trigger associated with storing the transaction attributes in the database.

51. The method of embodiment 46, further, comprising:
a transaction process optimizer component means, to:
obtain, via at least one processor, a borrow transaction notification associated with the borrow transaction;

update, via at least one processor, a set of utilized cumulative tracking attributes to reflect details of the borrow transaction;

determine, via at least one processor, that a sync threshold has been triggered based on analysis of the set of utilized cumulative tracking attributes; and send, via at least one processor, the blockchain sync notification to the blockchain sync adaptor component.

52. The method of embodiment 51, wherein the analysis of the set of utilized cumulative tracking attributes further comprises instructions to:

determine a set of utilized rules; and apply the set of utilized rules to the set of utilized cumulative tracking attributes to determine whether the sync threshold has been triggered.

53. The method of embodiment 51, wherein the analysis of the set of utilized cumulative tracking attributes further comprises instructions to:

determine a utilized machine learning structure; and provide the set of utilized cumulative tracking attributes as inputs to the utilized machine learning structure to determine whether the sync threshold has been triggered.

54. The method of embodiment 53, wherein the utilized machine learning structure is a neural network.

55. The method of embodiment 51, wherein the blockchain sync notification specifies a set of borrow transactions, including the borrow transaction, that should be synchronized to the blockchain network.

56. The method of embodiment 46, wherein the filtered transaction attributes are transactional attributes associated with the borrow transaction.

57. The method of embodiment 46, further, comprising: the blockchain sync adaptor component means, to:

generate a summary attribute using a hash of the filtered-out attributes; and wherein the smart contract includes the summary attribute.

58. The method of embodiment 46, wherein the smart contract is an Ethereum smart contract that utilizes an oracle.

59. The method of embodiment 51, wherein the smart contract includes a set of precalculated variables with values calculated before the smart contract is sent to the blockchain node;

wherein the smart contract includes a set of postcalculated variables with values to be calculated off-chain after the smart contract is sent to the blockchain node;

wherein the smart contract is configured to obtain the set of postcalculated variables from an oracle; and wherein the analysis of the set of utilized cumulative tracking attributes indicates an acceptable risk value associated with calculating values of the set of postcalculated variables off-chain.

60. The method of embodiment 47, wherein the smart contract is implemented to perform periodic settlement of collateral associated with the borrow transaction by transferring funds between the broker-dealer's account and the customer's account with the collateral agent;

wherein frequency of the periodic settlement is configured via an oracle;

wherein the smart contract notification is generated when a periodic settlement occurs; and wherein the user interface component notifies the user regarding the periodic settlement.

In order to address various issues and advance the art, the entirety of this application for Collateral Management with Blockchain and Smart Contracts Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a CMBSC individual and/or enterprise user, database configuration and/or relational model, data type, data transmission and/or network framework, syntax structure, and/or the like, various embodiments of the CMBSC, may be implemented that allow a great deal of flexibility and customization. For example, aspects of the CMBSC may be adapted for processing transaction other than borrow transactions. While various embodiments and discussions of the CMBSC have included information technology, however, it is to be understood that the embodiments described herein may be readily configured and/or customized for a wide variety of other applications and/or implementations.

What is claimed is:

1. A blockchain synchronizing apparatus, comprising:

at least one memory;

a component collection stored in the at least one memory;

any of at least one processor disposed in communication with the at least one memory, the any of at least one processor executing processor-executable instructions from the component collection, the component collection stored in the at least one memory structured with processor-executable instructions to:

obtain a borrow transaction request associated with a borrow transaction;

store a transaction attributes datastructure associated with the borrow transaction in a relational database, wherein the transaction attributes datastructure include a customer's customer identifier with a broker-dealer, an identifier of a fully paid security in the customer's broker-dealer account to be borrowed, and an identifier of a customer's account with a collateral agent that will hold collateral for the fully paid security to be borrowed, in which the relational database is not a token;

instantiate a database trigger associated with storing the transaction attributes datastructure in the relational database;

notify a transaction process optimizer component regarding the borrow transaction;

obtain a blockchain sync notification associated with the borrow transaction from the transaction process optimizer component;

filter the stored transaction attributes datastructure associated with the borrow transaction into filtered transaction attributes;

generate a smart contract associated with the borrow transaction, the smart contract includes filtered transaction attributes;

send the generated smart contract to a blockchain node of a blockchain network;

receive a smart contract notification associated with the smart contract; and provide a push notification to a user interface component of a user's client regarding the smart contract notification.

2. The blockchain synchronizing apparatus of claim 1, wherein the relational database is a write once read many (WORM) database.

3. The blockchain synchronizing apparatus of claim 1, wherein processor issuable instructions for the transaction process optimizer component are configured to be notified via a borrow transaction notification based on receipt of the borrow transaction request.

4. The blockchain synchronizing apparatus of claim 1, wherein processor issuable instructions for the transaction process optimizer component are configured to be notified via a borrow transaction notification from the relational database based on activation of a database trigger associated with storing the transaction attributes datastructure in the relational database.

5. The blockchain synchronizing apparatus of claim 1, further comprising:

the processor issuable instructions from the transaction process optimizer component are configured to:

obtain, via at least one processor, a borrow transaction notification associated with the borrow transaction;

update, via at least one processor, a set of utilized cumulative tracking attributes to reflect details of the borrow transaction;

determine, via at least one processor, that a sync threshold has been triggered based on analysis of the set of utilized cumulative tracking attributes; and send, via at least one processor, the blockchain sync notification to a blockchain sync adaptor component.

6. The blockchain synchronizing apparatus of claim 5, wherein the analysis of the set of utilized cumulative tracking attributes further comprises instructions configured to:

determine a set of utilized rules; and apply the set of utilized rules to the set of utilized cumulative tracking attributes to determine whether the sync threshold has been triggered.

7. The blockchain synchronizing apparatus of claim 5, wherein the analysis of the set of utilized cumulative tracking attributes further comprises instructions configured to:

determine a utilized machine learning structure; and provide the set of utilized cumulative tracking attributes as inputs to the utilized machine learning structure to determine whether the sync threshold has been triggered.

8. The blockchain synchronizing apparatus of claim 7, wherein the utilized machine learning structure is a neural network.

9. The blockchain synchronizing apparatus of claim 5, wherein the blockchain sync notification is configured with a set of borrow transactions, including the borrow transaction, that should be synchronized to the blockchain network.

10. The blockchain synchronizing apparatus of claim 1, wherein the filtered transaction attributes are transactional attributes associated with the borrow transaction.

11. The blockchain synchronizing apparatus of claim 1, further comprising:

the processor issues instructions from a blockchain sync adaptor component, stored in the memory, to:

generate a summary attribute using a hash of the filtered transaction attributes; and wherein the smart contract includes the summary attribute, wherein the summary attribute using a hash is generated by filtering-out non-transaction attributes associated with the borrow transaction, and applying a filter mask to filter-out off chain attributes.

12. The blockchain synchronizing apparatus of claim 1, wherein the smart contract is an smart contract that is configured to utilize an oracle and interact with a blockchain and smart contract cryptocurrency platform.

13. The blockchain synchronizing apparatus of claim 5, wherein the smart contract is configured to include a set of precalculated variables with values calculated before the smart contract is sent to the blockchain node;

wherein the smart contract is configured to include a set of postcalculated variables with values to be calculated off-chain after the smart contract is sent to the blockchain node;

wherein the smart contract is configured to obtain the set of postcalculated variables from an oracle; and wherein the analysis of the set of utilized cumulative tracking attributes is configured to indicate an acceptable risk value associated with calculating values of the set of postcalculated variables off-chain.

14. The blockchain synchronizing apparatus of claim 1, wherein the smart contract is configured to perform periodic settlement of collateral associated with the borrow transaction by transferring funds between a broker-dealer's account and the customer's account with the collateral agent;

wherein frequency of the periodic settlement is configured via an oracle;

wherein the smart contract notification is configured to be generated when a periodic settlement occurs; and wherein the user interface component is configured to notify the user regarding the periodic settlement.

15. A blockchain synchronizing processor-readable, non-transient medium storing a component collection, the component collection structured with processor executable instructions that, when executed by at least one processor, to:

obtain a borrow transaction request associated with a borrow transaction;

store a transaction attributes datastructure associated with the borrow transaction in a relational database, wherein the transaction attributes datastructure include a customer's customer identifier with a broker-dealer, an identifier of a fully paid security in the customer's broker-dealer account to be borrowed, and an identifier of a customer's account with a collateral agent that will hold collateral for the fully paid security to be borrowed, in which the relational database is not a token;

instantiate a database trigger associated with storing the transaction attributes datastructure in the relational database;

notify a transaction process optimizer component regarding the borrow transaction;

obtain a blockchain sync notification associated with the borrow transaction from the transaction process optimizer component;

filter the stored transaction attributes datastructure associated with the borrow transaction into a set of filtered transaction attributes;

generate a smart contract associated with the borrow transaction, the smart contract includes filtered transaction attributes;

send the generated smart contract to a blockchain node of a blockchain network;

receive a smart contract notification associated with the smart contract; and provide a push notification to a user interface component of a user's client regarding the smart contract notification.

16. A processor-implemented blockchain synchronizing system, comprising:

means to store a component collection;

means to process processor-executable instructions from the component collection, the component collection structured with processor-executable instructions to:

obtain a borrow transaction request associated with a borrow transaction;

store a transaction attributes datastructure associated with the borrow transaction in a relational database, wherein the transaction attributes datastructure include a customer's customer identifier with a broker-dealer, an identifier of a fully paid security in the customer's broker-dealer account to be borrowed, and an identifier of a customer's account with a collateral agent that will hold collateral for the fully paid security to be borrowed, in which the relational database is not a token;

instantiate a database trigger associated with storing the transaction attributes datastructure in the relational database;

notify a transaction process optimizer component regarding the borrow transaction;

obtain a blockchain sync notification associated with the borrow transaction from the transaction process optimizer component;

filter the stored transaction attributes datastructure associated with the borrow transaction into a set of filtered transaction attributes;

generate a smart contract associated with the borrow transaction, the smart contract includes filtered transaction attributes;

send the generated smart contract to a blockchain node of a blockchain network;

receive a smart contract notification associated with the smart contract; and provide a push notification to a user interface component of a user's client regarding the smart contract notification.

17. A blockchain synchronizing method, including processing processor-executable instructions via any of at least one processor from a component collection stored in at least one memory, the component collection structured with processor-executable instructions comprising:

obtaining a borrow transaction request associated with a borrow transaction;

storing a transaction attributes datastructure associated with the borrow transaction in a relational database, wherein the transaction attributes datastructure include a customer's customer identifier with a broker-dealer, an identifier of a fully paid security in the customer's broker-dealer account to be borrowed, and an identifier of a customer's account with a collateral agent that will hold collateral for the fully paid security to be borrowed, in which the relational database is not a token;

instantiating a database trigger associated with storing the transaction attributes datastructure in the relational database;

notifying a transaction process optimizer component regarding the borrow transaction;

obtain a blockchain sync notification associated with the borrow transaction from the transaction process optimizer component;

filtering the stored transaction attributes datastructure associated with the borrow transaction into a set of filtered transaction attributes;

generating a smart contract associated with the borrow transaction, the smart contract includes filtered transaction attributes;

sending the generated smart contract to a blockchain node of a blockchain network;

receive a smart contract notification associated with the smart contract; and providing a push notification to a user interface component of a user's client regarding the smart contract notification.

* * * * *